United States Patent
Lee

(10) Patent No.: US 9,413,426 B2
(45) Date of Patent: Aug. 9, 2016

(54) MOBILE TERMINAL, DISPLAY DEVICE AND METHOD FOR CONTROLLING THE MOBILE TERMINAL

(71) Applicant: LG ELECTRONICS INC., Seoul (KR)

(72) Inventor: Dongho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 154 days.

(21) Appl. No.: 13/791,644

(22) Filed: Mar. 8, 2013

(65) Prior Publication Data

US 2014/0051354 A1    Feb. 20, 2014

(30) Foreign Application Priority Data

Aug. 20, 2012  (KR) .................. 10-2012-0090537

(51) Int. Cl.
H04B 5/00        (2006.01)

(52) U.S. Cl.
CPC ....................... H04B 5/00 (2013.01)

(58) Field of Classification Search
CPC .. H04B 5/0031; H04B 5/0056; H04B 5/0062; H04B 5/02
USPC ........................................ 455/41.1
See application file for complete search history.

(56) References Cited

U.S. PATENT DOCUMENTS

| | | | | |
|---|---|---|---|---|
| 8,839,150 B2* | 9/2014 | King | .................. | G06F 3/017 715/836 |
| 2002/0140625 A1* | 10/2002 | Kidney | ............... | G06F 3/0481 345/1.1 |
| 2009/0063986 A1* | 3/2009 | Camenisch | ........... | G06F 21/64 715/733 |
| 2010/0099445 A1* | 4/2010 | Song | ............... | H04M 1/72552 455/466 |
| 2010/0259491 A1* | 10/2010 | Rajamani | ......... | H04M 1/72527 345/173 |
| 2011/0205140 A1* | 8/2011 | Amadeo | ............ | H01F 41/0687 343/866 |
| 2012/0322367 A1* | 12/2012 | Kee | ..................... | H04B 5/00 455/41.1 |
| 2014/0091987 A1* | 4/2014 | Lee | ...................... | H04L 65/00 345/2.3 |
| 2014/0222594 A1* | 8/2014 | Rose | ................... | G06Q 20/12 705/16 |

* cited by examiner

*Primary Examiner* — Ajibola Akinyemi
(74) *Attorney, Agent, or Firm* — Lee, Hong, Degerman, Kang & Waimey; Jonathan Kang; Harry Lee

(57) ABSTRACT

There is disclosed a mobile terminal includes a display, a plurality of NFC antennas arranged in a circumferential portion of the display to transmit and receive NFC (Near Field Communication) signals, and a controller configured to receive a position of the mobile terminal on an external display device from the mobile terminal via the NFC antennas or to calculate a position of the mobile terminal on an external display device.

20 Claims, 18 Drawing Sheets

FIG. 13
(a)
(b)

FIG. 14
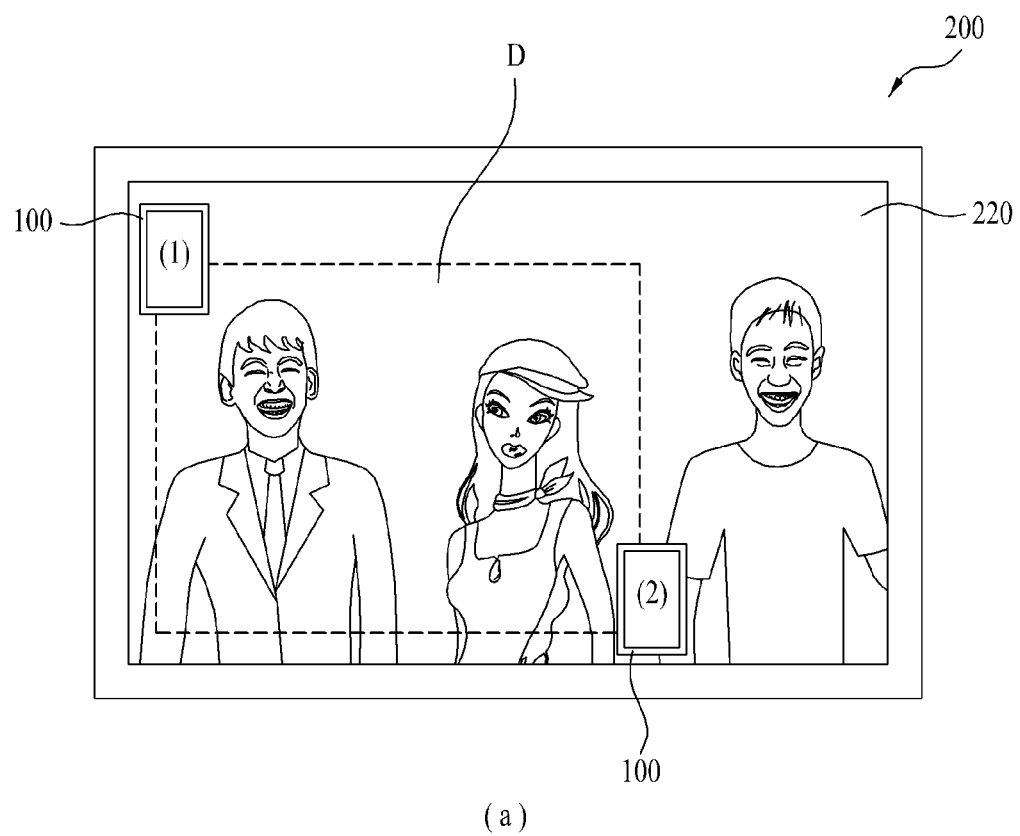
(a)
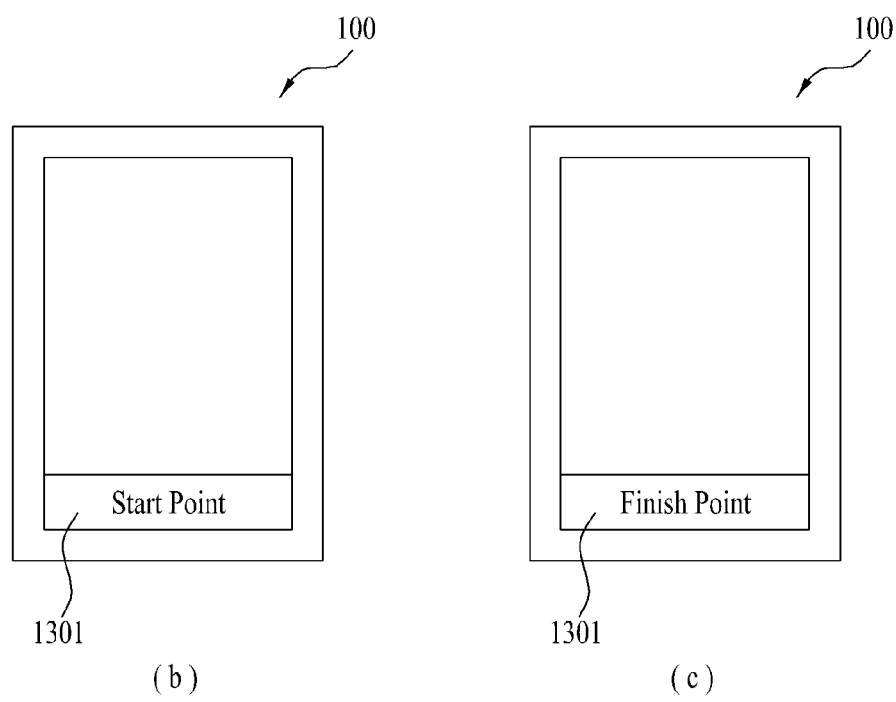
(b)           (c)

FIG. 19
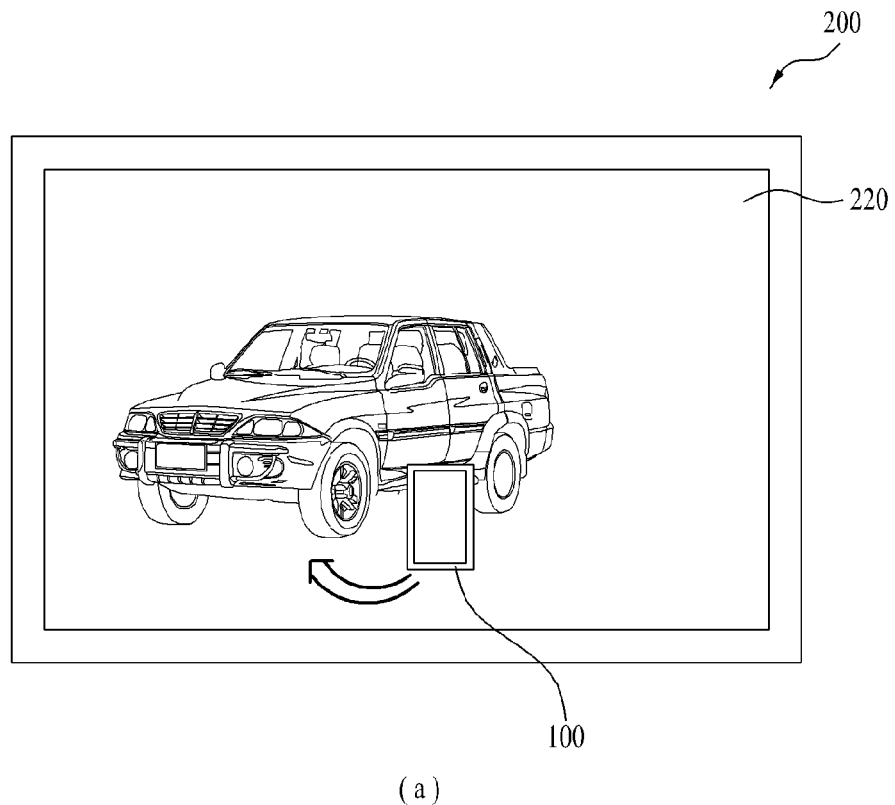
(a)
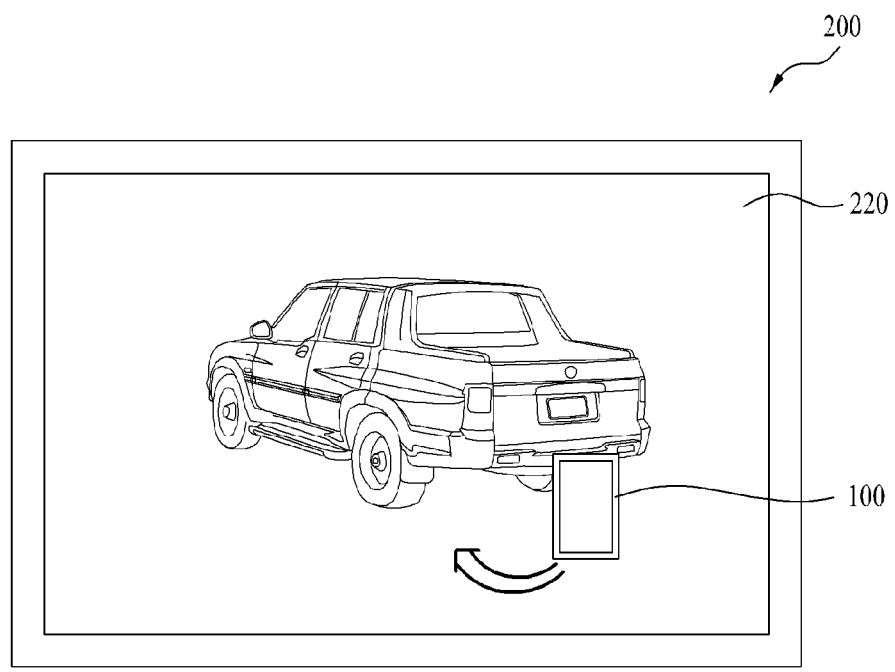
(b)

MOBILE TERMINAL, DISPLAY DEVICE AND METHOD FOR CONTROLLING THE MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2012-0090537, filed on Aug. 20, 2012, the contents of which are hereby incorporated by reference herein in their entirety.

BACKGROUND OF THE DISCLOSURE

1. Field of the Disclosure

Embodiments may relate to a mobile terminal that is able to perform functions based on display information transmitted according to a position thereof on an external display device.

2. Discussion of the Related Art

Generally, terminals can be classified into mobile terminals and stationary terminals. In addition, the mobile terminals can be further classified into handheld terminals and vehicle mount terminals.

Further, a mobile terminal is a device which may be configured to perform various functions such as data and voice communications, capturing images and video via a camera, recording audio, playing music files and outputting music via a speaker system, and displaying images and video on a display.

There are ongoing efforts to support and increase the functionality of mobile terminals. Such efforts include software and hardware improvements, as well as changes and improvements in the structural components which form the mobile terminal.

Recently, a NFC (Near Field Communication) function is loaded on a mobile terminal. However, such a conventional NFC function is configured only to transmit a specific tip of information on a mobile terminal via one touch and fails to utilize information on the position of the mobile terminal on an external display device.

SUMMARY OF THE DISCLOSURE

Accordingly, embodiments may be directed to a mobile terminal that substantially obviates one or more problems due to limitations and disadvantages of the related art. An object of embodiments may be to provide a mobile terminal that is able to utilize various NFC functions with an external display device by utilizing information on the position of the mobile terminal on an external display device provided therein.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal includes a display; a plurality of NFC antennas arranged in a circumferential portion of the display to transmit and receive NFC (Near Field Communication) signals; and a controller configured to receive a position of the mobile terminal on an external display device from the mobile terminal via the NFC antennas or to calculate a position of the mobile terminal on an external display device.

In another aspect of embodiments, a method for controlling a mobile terminal includes steps of receiving a NFC signal of an external display device; calculating a position of a mobile terminal on the external display device based on the received NFC signal; transmitting the calculating position to the external display device; receiving display information corresponding to the calculated position from the external display device; and implementing a function according to the received display information.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 11 to 14 are diagrams illustrating that an image displayed on the external display device is captured by the mobile terminal;

FIG. 19 is a diagram illustrating an example of a method for controlling an external display device by a mobile terminal based on position variation tracing with respect to the mobile terminal;

DESCRIPTION OF SPECIFIC EMBODIMENTS

In the following detailed description, reference is made to the accompanying drawing figures which form a part hereof, and which show by way of illustration specific embodiments of the invention.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipments, smart phones, digital broadcast receivers, personal digital assistants, laptop computers, portable multimedia players (PMP), navigators and the like.

Yet, it is apparent to those skilled in the art that a configuration according to an embodiment disclosed in this specification is applicable to such a fixed terminal as a digital TV, a desktop computer and the like as well as a mobile terminal.

Figure 1:
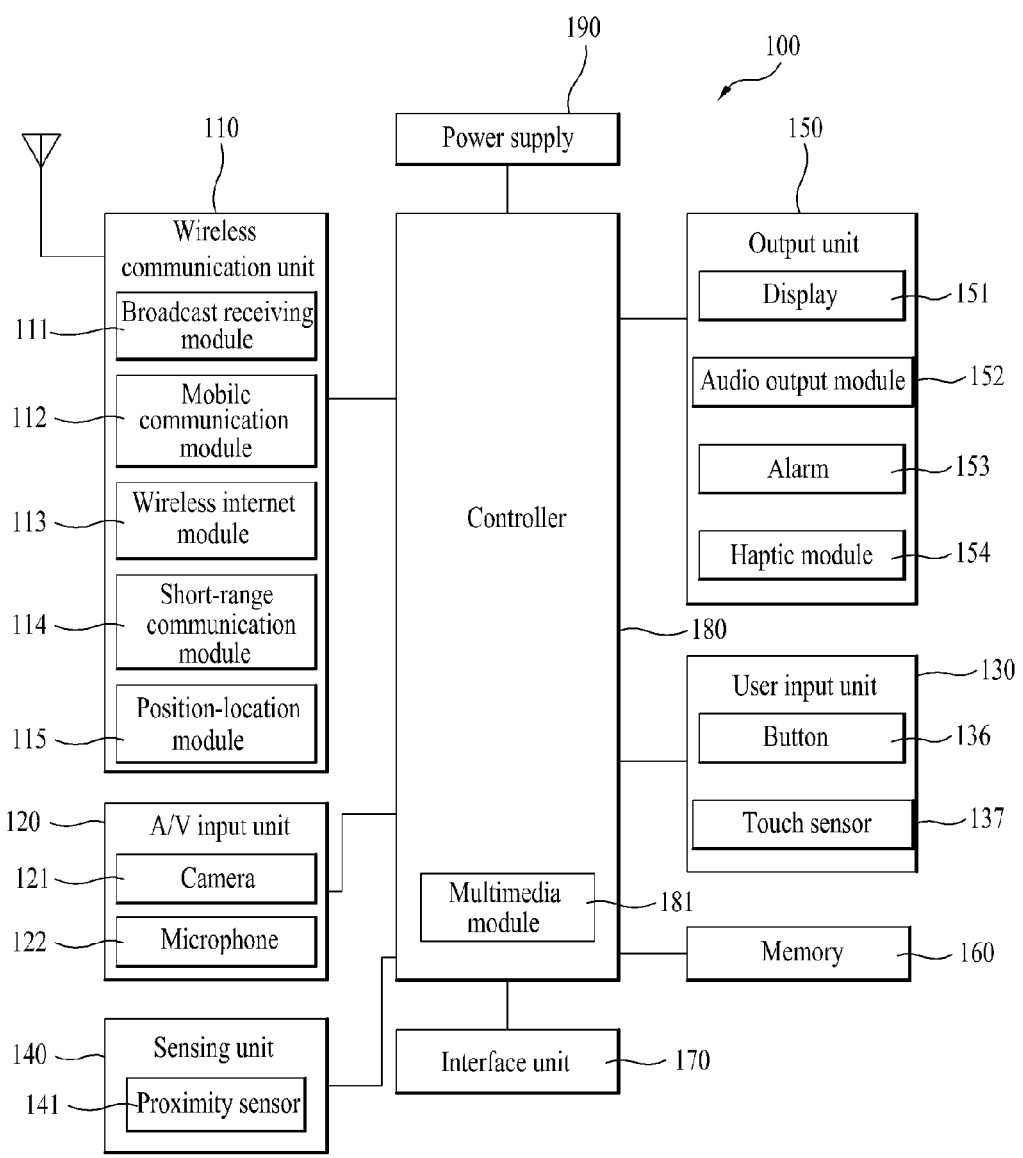
FIG. 1 is a block diagram of a mobile terminal according to one example embodiment of the present invention.

FIG. 1 is a block diagram of a mobile terminal 100 in accordance with an embodiment of the present invention.

FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transmission and reception, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), near field communication (NFC), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (pressure sensitive touch/capacitive touch) 137 and may further include a key pad, a dome switch, a jog wheel, a jog switch and the like [not shown in the drawing].

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By nonlimiting example, such sensing unit 140 include, gyro sensor, accelerate sensor, geomagnetic sensor.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittable type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it is able to use the display 151 as an input device as well as an output device. In this case, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Figure 2:
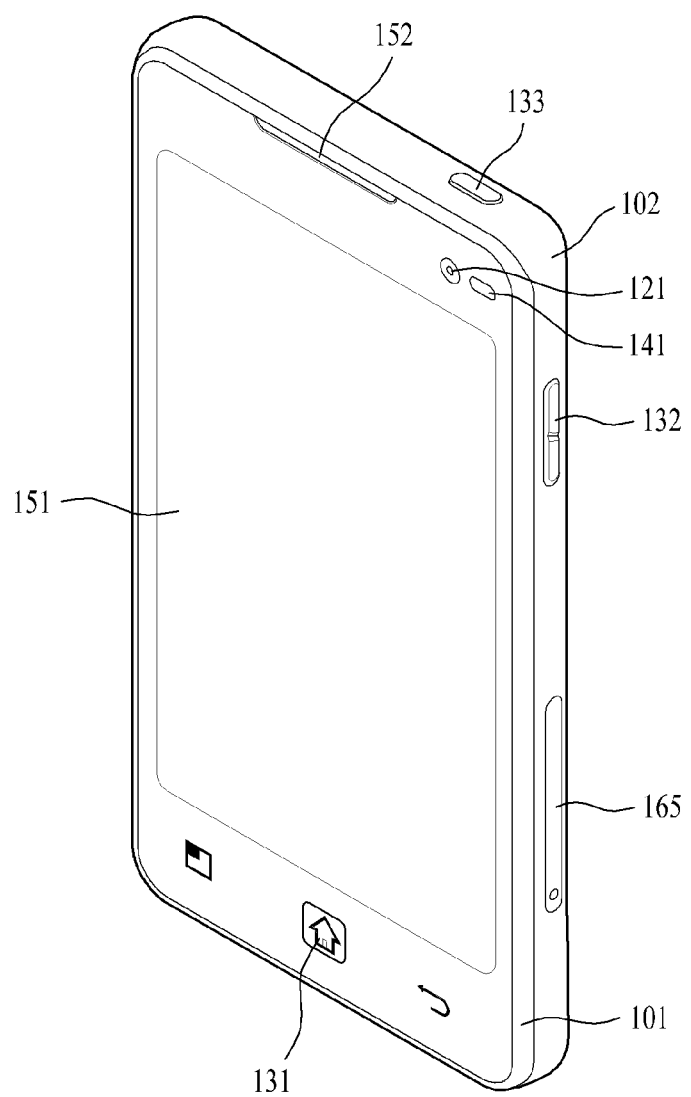
FIG. 2 is a front perspective diagram of a mobile terminal according to one embodiment of the present invention.

Referring to FIGS. 1 and 2, a proximity sensor 141 can be provided to an internal area of the mobile terminal 100 enclosed by the touchscreen or around the touchscreen. The proximity sensor 141 is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output in a manner of being synthesized together or can be output in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices.

The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Next, FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case 101, 102, 103 configuring an exterior thereof. In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part such as a battery, a USIM card, a memory card and the like. In doing so, the rear case 102 may further include a backside cover 103 (see FIG. 3) configured to cover the surface of the rear case 102. In particular, the backside cover 103 has a detachable configuration for the user's convenience. If the backside cover 103 is detached from the rear case 102, the surface of the rear case 102 is exposed.

Figure 3:
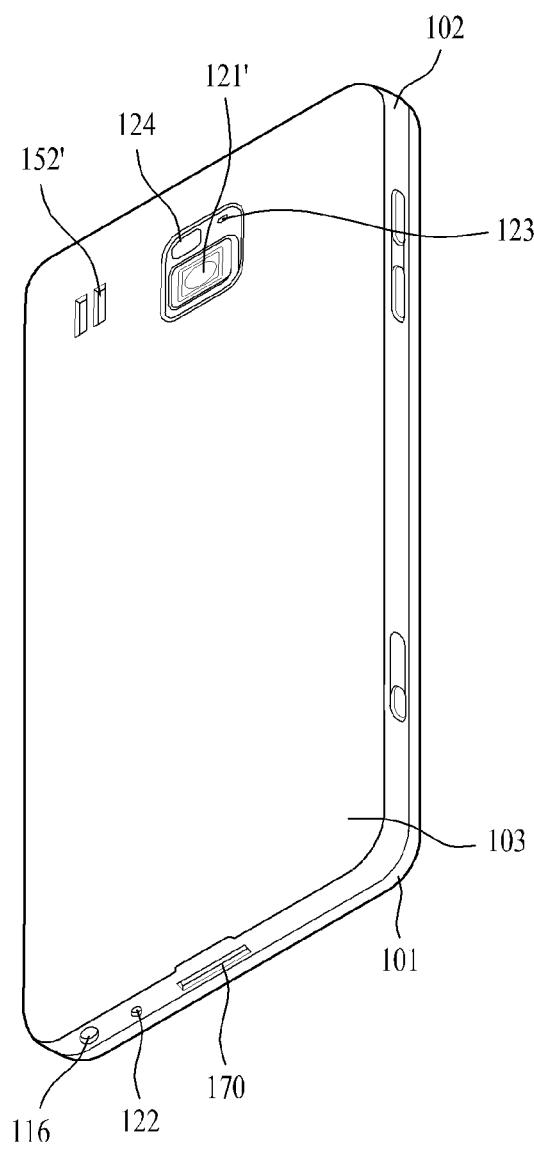
FIG. 3 is a rear perspective diagram of a mobile terminal according to one embodiment of the present invention.

Referring to FIG. 3, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening 103' (see FIG. 4) configured to expose a camera 121' or an audio output unit 152' externally.

The cases 101, 102 and 103 can be formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 170 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152 and the like can be input to the second manipulating unit 132, a command for a switching to a touch recognizing mode of the display 151 and the like can be input to the second manipulating unit 133.

A button type is configured to recognize a pressure applied by a user to each of the manipulation units 131, 132 and 133. If a touch sensor is provided to each of the manipulation units 131, 132 and 133 in addition to the display unit 151, a user's command can be inputted by a user's touch.

FIG. 3 is a perspective diagram of a backside of the terminal shown in FIG. 2.

Referring to FIG. 3, the camera 121' can be additionally provided to a backside of the terminal body, and more particularly, to the rear case 102. The camera 121 has a photographing direction that is substantially opposite to that of the former camera 121 shown in FIG. 2 and may have pixels differing from those of the firmer camera 121.

Preferably, for instance, the camera 121 has low pixels enough to capture and transmit a picture of user's face for a video call, while the latter camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

The additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

Referring to the accompanying drawings, embodiments of a controlling method that can be realized in the mobile terminal having the configuration mentioned above will be described as follows.

Recently, short range communication between terminals is in the world limelight, because a user carrying a mobile terminal can utilize the mobile terminal having such function of short range communication as means of payment. A typical case of means of such the short range communication includes NFC (Near Field Communication).

NFC (Near Field Communication) is a type of RFID (Radio Frequency Identification) technology that enables data transmission between terminals in a sort range via a non-contact short range wireless communication module using a specific frequency band, for example, 13.56 MHz.

NFC can be widely applied to not only payment but also transmission of product information in a supermarket or a typical store or travel information for customers, traffic and an access control locking device.

Such NFC technology can be applied to the mobile terminal 100.

In case NFC technology is applied to the mobile terminal, a terminal having a tag embedded therein is operated in an active mode as a concept expanded from a conventional RFID. The terminal having the tag embedded therein to be operable in the active mode can perform not only a function of a tag but also functions of a reader for reading a tag and a writer for inputting information to a tag. In addition, such the terminal can enable P2P (Peer to Peer) communication between terminals.

International Standard ISO 18092 of NFC can be compatible with International Standard ISO 1443 of a non-contact smart card, Felica of Sonny, MiFare of Phillips and so on.

For example, a NFC tag can be categorized into four types as shown in following Table 1.

TABLE 1

| CATEGORY | TYPE 1 | TYPE 2 | TYPE 3 | TYPE 4 |
| --- | --- | --- | --- | --- |
| RF Interface | ISO 14443A | ISO 14443A | ISO 18092 | ISO 14443 |
| Speed | 106 kbps | | 212 kbps | 106~424 kbps |
| Protocol | Introduction itself | Introduction itself | Felica Protocol | ISO 14443~4 ISO 7816~4 |
| Memory Size | 1 KB or less | 2 KB or less | 1 MB or less | 64 KB or less |
| Application Field | Low Capacity Tag for Single Application Service | | High Capacity Tag for Multiple Application Service | |

The types of the NFC tag shown in Table 1 are only examples and it is obvious that the types can be realized as other types.

In addition, NFC can be categorized into three types of operation modes as shown in following Table 2. Here, following Table 2 is one of examples of the present invention and it is obvious that NFC can be used in other operation types of operation modes.

TABLE 2

| MODE | DESCRIPTION |
| --- | --- |
| PSP | PSP can process direct data communication between all types of devices providing NFC, for example, Data transmission between smart phones, file share between PC and smart phone, information update between an electric appliance and a smart phone. Different from conventional short range wireless communication, for example, Wifi and Bluetooth, PSP can be realized by an intuitive user utilization method of 'Touch' and data communication can be connected by PSP very simply. |
| R/W | R/W implements direct information acquisition by contacting an NFC smart phone with a poster having an RFID tag attached thereto and provides connection with a related website to enable new service connection. |
| SC | SC can provide a safe mobile payment by grafting non-contact smart card technology onto security technology and it can be used as various payment means, for example, a traffic card and a coupon. When a PC providing NFC, it is very convenient to use NFC as an authentication method and payment means of E-commerce. |

Figure 4:
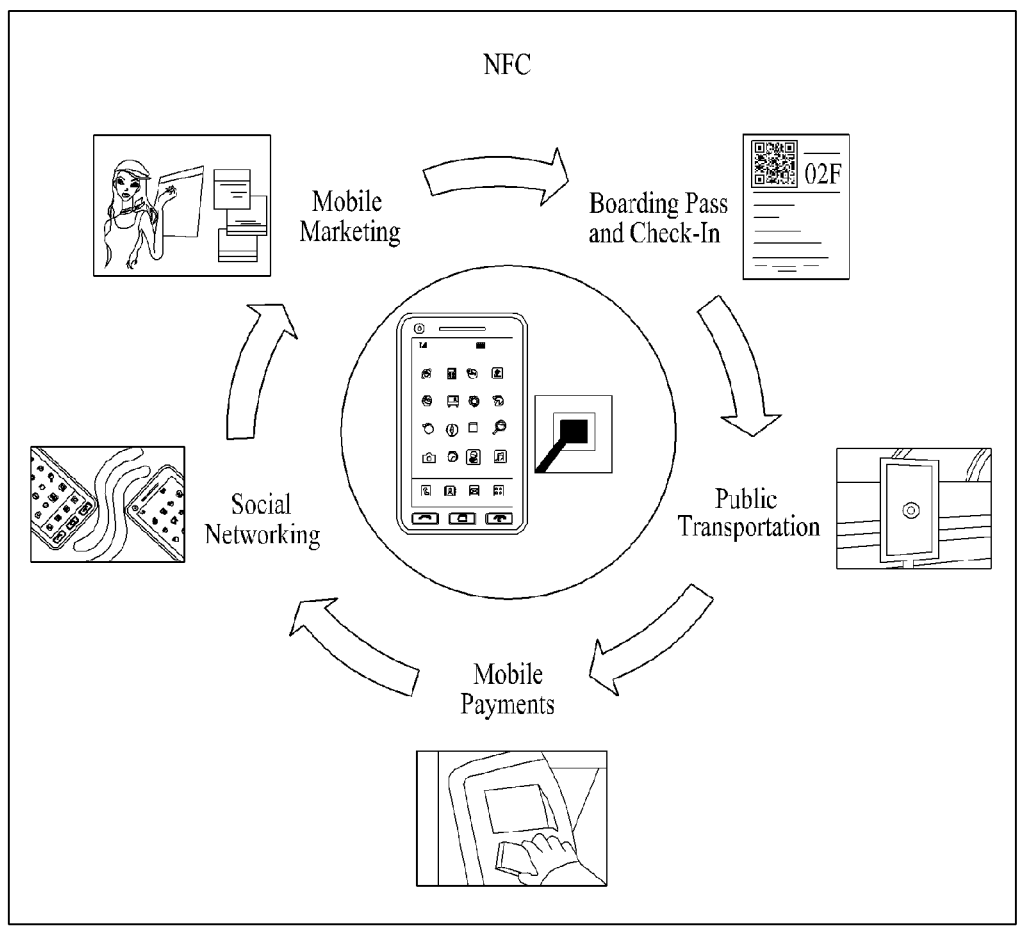
FIG. 4 is a diagram illustrating a service associated with NFC (Near Field Communication) applied to the present invention.

In addition, representative application services of NFC applied to the mobile terminal 100 can be categorized as shown in FIG. 4. Here, specific application services shown in FIG. 4 are simple examples the present invention is applied to and it is obvious that other types of services can be provided.

First of all, NFC can be applied to a contact application service between mobile terminals.

For example, such a contact application service may include a payment service, an account transfer service via on-line account association, and a business card information exchange service including a number and an e-mail, and a wireless communication link service such as pay-ring for data exchange between terminals.

Next, NFC can be applied to a personal information management application service.

For example, such a personal information management application service includes a personal authentication service such as door opening/closing via authentication, a user authentication method for a notebook and other electric appliances, and an access control including remote control for a building and a vehicle.

Moreover, the personal information management application service can be used in an application service associated with information providing and targeted advertisements.

For example, a guide service including museum, sightseeing information providing (voice/texture) and location guide, a medical service including medical record management, a parking service including parking area identification, a reservation service including a show ticketing via poster contact and public transportation ticketing, an advertising and coupon service including position-based advertisements and coupon providing, a product information service including product information reading, appraisal of an original from a fake, traceability, manual providing and after-sale service information providing, a contents purchase service including contents downloading such as E-books and music, and a social network service for transmitting information read from a tag to a social network directly.

For explanation convenience sake, it is assumed that the mobile terminal 100 which will be mentioned as follows includes at least one of the elements shown in FIG. 1.

Referring to FIGS. 5 to 23, there will be described in detail a process of performing a function based on display information received by the mobile terminal according to a calculated position of the mobile terminal on an external display device.

Figure 5:
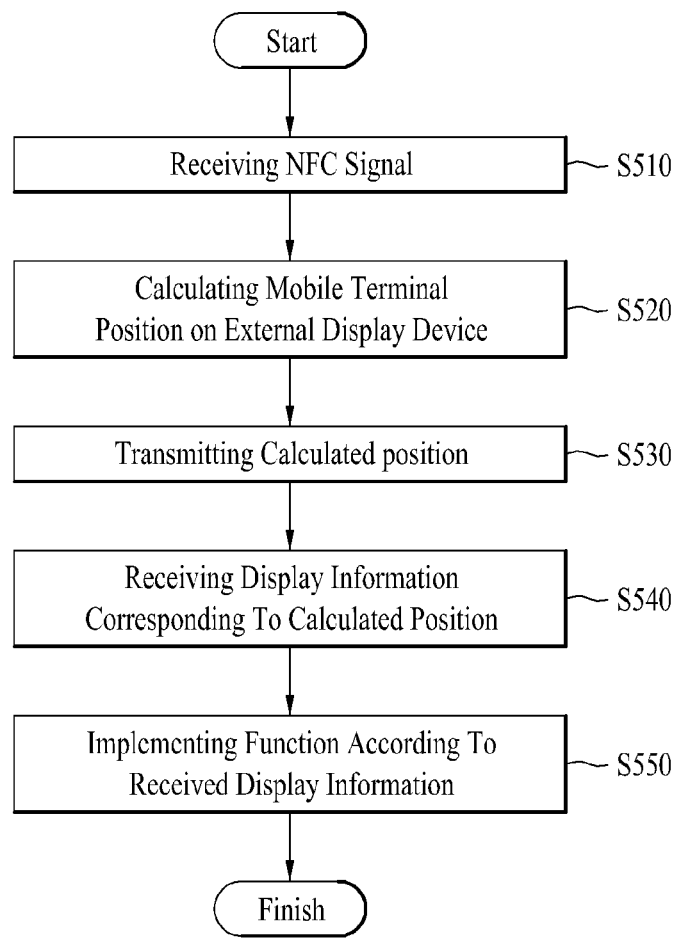
FIG. 5 is a flow chart illustrating a process of performing a specific operation according to a position of a mobile terminal on an external display device in the mobile terminal according to one embodiment of the present invention.

FIG. 5 is a flow chart illustrating a process of performing a specific operation according to a position of a mobile terminal on an external display device in the mobile terminal according to one embodiment of the present invention.

The mobile terminal 100 according to one embodiment of the present invention may receive a NFC signal from an external display device 200 (S510). For example, the external display device 200 may include a monitor, a notebook computer, an outdoor advertising billboard, a TV and another mobile terminal. The present invention is not limited thereto.

At this time, the external display device 200 may include an NFC array antenna 230 arranged in a predetermined portion of a bezel region 210 formed in an outer circumferential surface thereof. A NFC signal is transmitted from the NFC array antenna 230 arranged in the external display device 200 and the transmitted NFC signal may be received by a wireless communication unit 110 of the mobile terminal 100. The NFC array antenna 230 may be configured of a plurality of NFC array antennas. Each of the NFC array antennas can transmit a different NFC signal at a different frequency or a NFC signal having a different identification code. In addition, the wireless communication unit 110 may be configured of a NFC device 114.

The mobile terminal 100 may calculate a position of the mobile terminal 100 on the external display device 200 based on the frequency or identification code of the received NFC signal (S520). At this time, the controller 180 of the mobile terminal 100 may detect at least one of activated currents, voltages or electricity of the NFC device 114 provided in the mobile terminal based on the NFC signal transmitted from the NFC array antennal 230 and it may calculate the position of the mobile terminal 100 on the external display device 200 based on the detected information.

The mobile terminal 100 transmits the calculated position to the external display device 200 (S530). The external display device 200 may receive the calculated position of the mobile terminal 100 transmitted from the mobile terminal 100 and send specific display information corresponding to the position of the mobile terminal 100 to the mobile terminal 100.

The mobile terminal 100 may receive the display information corresponding to the position of the mobile terminal 100 on the external display device 200 (S540) and it may implement a function according to the received display information (S550).

There will be described the process of implementing the function according to the received display information corresponding to the calculated position of the mobile terminal 100 on the external display device in detail as follows.

Figure 6:
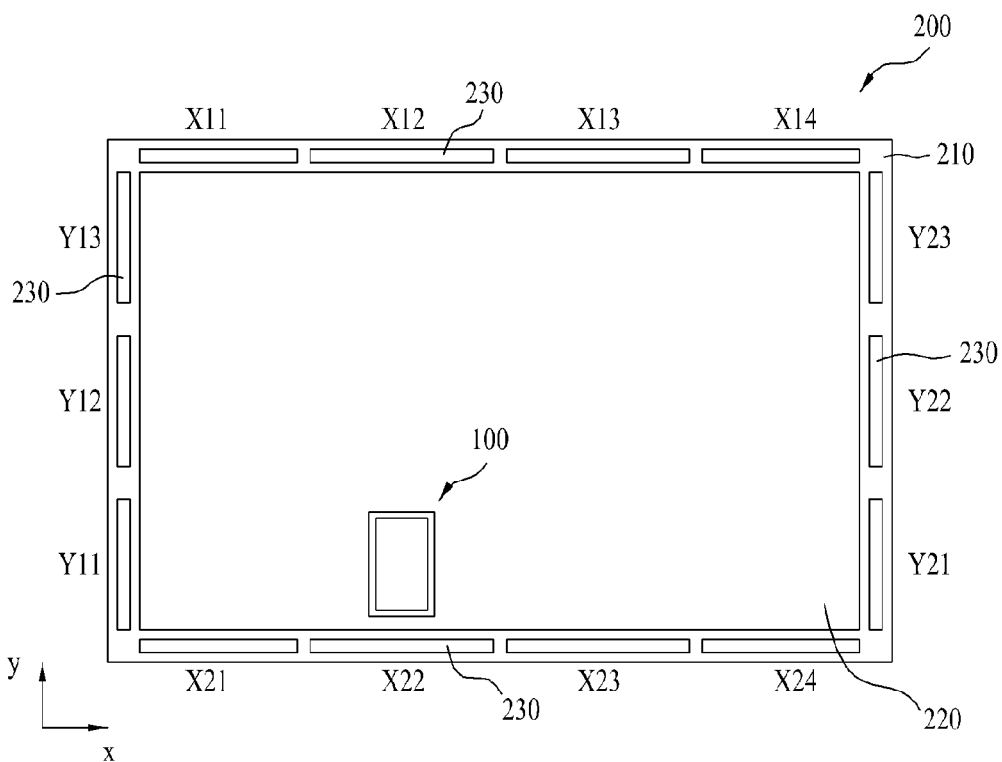
FIG. 6 is a diagram schematically illustrating a method of calculating a position of a mobile terminal on an external display device.

FIG. 6 is a diagram schematically illustrating a method of calculating a position of a mobile terminal on an external display device.

The external display device 200 may include the NFC array antenna 230 arranged in a predetermined portion of the bezel region 210 formed in the outer circumferential surface of the external display device 200. The NFC signal transmitted from the NFC array antenna 230 may be received by the NFC device 114 of the mobile terminal 100. The controller 180 of the mobile terminal 100 can calculate the position of the mobile terminal 100 by using the received NFC signal.

A method for calculating the position of the mobile terminal 100 on the external display device 200 will be described in detail as follows.

Referring to FIG. 6, the external display device 200 has the bezel region 210 formed in the outer circumferential surface thereof. The NFC array antenna 230 may be arranged in the bezel region 210. According to one embodiment, the external display device 200 may be formed in a rectangular shape and the shape of the external display device 200 may not be limited thereto. It may be formed in various shapes.

In case the external display device 200 is formed in the rectangular shape, at least one NFC array antenna 230 may be provided in each of sides possessed by the rectangular-shaped bezel region surrounding the display 220 of the external display device 200. According to one embodiment, a plurality of NFC array antennas may be arranged in each of the sides possessed by the bezel region 210 and the NFC array antennas may generate NFC signals at different frequencies, respectively, or NFC signals having different identification codes, respectively. The more NFC array antennas are arranged in the bezel region 210, the more minutely be the position of the mobile terminal 100 calculated on the external display device 200.

In FIG. 6, four NFC array antennas (X11, X12, X13, X14, X21, X22, X23 and X24) are arranged in sides along X-axis and three NFC array antennas (Y11, Y12, Y13, Y21, Y22 and Y23) are arranged on sides along Y-axis. However, the number of the NFC array antennas is not limited thereto.

The mobile terminal 100 may receive the NFC signal transmitted from the NFC array antennas 230 arranged in the predetermined portion of the bezel region 210 formed in the external display device 200. After that, the mobile terminal 100 detects at least one of the currents, voltages and electricity activated in the NFC device 114 thereof and the position of the mobile terminal 100 may be recognized based on the detected information.

When it is positioned on the display 220 of the external display device 200, the mobile terminal 100 receives the NFC signal transmitted from the NFC array antennas 230 arranged in the bezel region 210 of the external display device 200.

For example, as shown in FIG. 6, when it is positioned between X12 and X22 and Y11 an Y21 out of the NFC array antennas 230 of the external display device 200, the mobile terminal 100 receives the NFC signal transmitted from X12 and X22 and measures the reception sensitivity of the received NFC signal, to calculate a Y-axis position of the mobile terminal 100.

Moreover, the mobile terminal 100 receives the NFC signal transmitted from Y11 and Y21 and measures the reception sensitivity of the NFC signal, to calculate an X-axis position of the mobile terminal 100.

More specifically, the mobile terminal 100 compares the intensity of the NFC signal transmitted from X12 with the intensity of the NFC signal transmitted from X21. At this time, the frequency of X12 may be different from that of X21 or the identification code transmitted from X12 may be different from the identification code transmitted from X21. The controller 180 of the mobile terminal 100 distinguishes the NFC signal transmitted from X12 and the NFC signal transmitted from X21 from each other, only to calculate the position of the mobile terminal 100 on the external display device 200. In the drawings, the mobile terminal 100 is positioned closer to X22 and the intensity of the NFC signal transmitted from X22 is relatively larger and the intensity of the NFC signal transmitted from X12 is relatively smaller. The controller 180 can calculate the accurate position of the mobile terminal 100 along Y-axis on the external display device 200 based on the ratio of the signal intensities. Also, the controller 180 can calculate the position of the mobile terminal 100 by calculating the distance according to the intensity of the NFC signal.

Moreover, the mobile terminal 100 may compare the intensity of the NFC signal transmitted from Y11 with the intensity of the NFC signal transmitted from Y21 and calculate an accurate position of the mobile terminal 100 along X-axis on the external display device 200 based on the result of the comparison. Y11 and Y21 have different frequencies, respectively, or transmit NFC signals having different identification codes, respectively. Accordingly, the controller 180 distinguishes the NFC signal transmitted from Y11 and the NFC signal transmitted from Y21 and it may calculate the position of the mobile terminal 100 on the external display device 200. In FIG. 6, the mobile terminal 100 is positioned closer to Y11, such that the intensity of the NFC signal transmitted from the Y11 may be relatively larger and the intensity of the NFC signal transmitted from Y21 may be relatively smaller. The controller 180 can calculate an accurate position of the mobile terminal 100 along X-axis on the external display device 200 based on the ratio of the signal intensities. Optionally, the controller 180 can calculate the distances according to the intensities of the NFC signals and calculate the position of the mobile terminal based on the distances.

According to one embodiment, the mobile terminal 100 may receive NFC signals the other NFC array antennas 230, in other words, X11, X13, X14, X21, 23, X24, Y12, Y13, Y22 and Y23, but X12, X22, Y11 and Y21, and it may measure the signal reception sensitivity. In this instance, the distance of the mobile terminal 100 from each of the NFC array antennas can be measured and the accuracy of the position of the mobile terminal 100 on the display device 200 can be enhanced accordingly.

For example, the mobile terminal 100 receives NFC signals from X11, X12, X13 and X14 to measure the intensities of the received NFC signals. The mobile terminal 100 can measure an X-axis position thereof based on the measured intensities. In the drawings, the mobile terminal 100 is positioned closer to X12 and the intensity of the NFC signal transmitted from X12 is the largest. The intensities of the NFC signals transmitted from X11 and X13 the second largest and the intensity of the NFC signal transmitted from X14 is the smallest. The controller 180 can calculate that the mobile terminal 100 is positioned on X12 in an X-axial direction. The controller 180 measure measures the intensities of the NFC signals transmitted from X21, X22, X23 and X24 and calculates that the mobile terminal 100 is positioned on X22 in an axial direction on the external display device 200. Based on the X-axial direction positions calculated from X11, X12, X13, X14, X21, X22 X23 and X24, the accurate positions of the mobile terminal 100 on the external display device 200 in an X-axial direction can be calculated.

The mobile terminal 100 measures the intensities of the NFC signals transmitted from Y11, Y12 and Y13 and it measures a Y-axis position of the mobile terminal 100 based on the measured intensities. In the drawings, the mobile terminal 100 is positioned closer to Y11 and the intensity of the NFC signal transmitted from Y11 is the largest. The intensity of the NFC signal transmitted from Y12 is the second largest and the intensity of the NFC signal transmitted from Y13 is the smallest. Based on the ratio of the signal intensities, the controller 180 can calculate that the mobile terminal 100 is positioned on Y11 on the external display device 200 along Y-axis direction. Also, the controller 180 may measure the intensities of the NFC signals transmitted from Y21, Y22 and Y23 and calculate that the mobile terminal 100 is positioned on Y21 on the external display device 200 along Y-axis direction based on the measures intensities. Based on the calculated Y-axis direction position from Y11, Y12 and Y13 and Y21, Y22 and Y23, the accurate Y-axis direction position of the mobile terminal 100 on the external display device 200 can be calculated.

At this time, each of the NFC array antennas 230 arranged on the external display device 200 can be operated. In other words, the NFC signals are transmitted to the mobile terminal 100 from the NFC array antennas 230, respectively. In this instance, the NFC array antenna transmits the NFC signals, respectively, and the accuracy of position calculation associated with the position recognition ability of the mobile terminal 100 can be enhanced.

According to one embodiment, the NFC array antennas 230 receive a pair of signals to recognize whether the mobile terminal 100 is located in the arrangement thereof or how the mobile terminal 100 is overlapped there with. Referring to FIG. 6, for example, in case of X11 and X21, X21 receives the NFC signal transmitted from X11, to recognize whether the mobile terminal 100 is positioned between X11 and X21, and measures the intensities of the signals to recognize whether the mobile terminal 100 is overlapped there with. When the NFC signal transmitted from X11 is received by X21, without being blocked, it can be determined that the mobile terminal 100 is not positioned between X11 and X21. Also, the NFC signal transmitted from X21 is received by X11 and it is recognized whether the mobile terminal is positioned between X11 and X21 or whether the mobile terminal 100 is overlapped with X11 and X21. In case of X12 and X22, the mobile terminal 100 is positioned between X12 and X22 and the NFC signal transmitted from X12 partially blocked in the mobile terminal 100 is received by X22. Accordingly, a controller 280 of the external display device 200 may calculate an overlapped portion between the mobile terminal 100 and X12 and X22 by measuring a blocking degree of the blocked signal. X13 and X23, X14 and X24, Y11 and Y21, Y12 and Y22 and Y13 and Y23 receive the NFC signals transmitted from facing NFC array antennas 230, to recognize whether the mobile terminal is positioned in arrangements thereof or overlapped therewith.

A touch screen method can be used as a method for calculating a position of the mobile terminal 100 on the external display device 200. In other words, when the mobile terminal 100 contacts with the touch screen type external display device 200, the external display device 200 may recognize a contacting point as the position of the mobile terminal 100.

However, the touch screen type is limitedly used for a large-sized external display device 200 because of the high price of a touch panel provided in the touch screen type. Accordingly, according to the present invention, at least one NFC array antenna 230 may be arranged in the bezel region 210 of the external display device 200. In case the position of the mobile terminal 100 on the external display device 200 is calculated by using the NFC signals transmitted from the NFC array antenna 230, the accurate calculation of the mobile terminal position can be realized with a relatively low price, compared with the touch screen type.

If the NFC array antenna 230 is arranged in a front side of the display 220, not in the bezel region 210 of the external display device 200, a monitor sharpness of the display 220 might deteriorate. That is because the NFC array antenna 230 could partially shade the lights emitted from the display 220. Even if the NFC array antenna 230 is formed of a transparent conductive film, it is difficult for the conductive film to have a light transmittance of 100% and the lights have to be blocked inevitably.

If the NFC array antenna 230 is arranged in a back side of the display 330, it is difficult to figure out the accurate electric field intensity and the accurate position of the mobile terminal 100 on the external display device 200 cannot be calculated accordingly. Components formed of conductive materials could block or distort the NFC signals transmitted from the NFC array antenna 230 arranged in the back side of the display toward the mobile terminal 100 positioned in a front side of the display 220.

Accordingly, when the NFC array antenna 230 is arranged in the bezel region 210 of the external display device 200, the position of the mobile terminal 100 on the external display device 200 can be calculated accurately. Especially, in case the size of the external display device 200 is large, the number of the NFC array antennas 230 can be reduced and an effect of the reduced production cost can be gained, compared with the NFC array antennas arranged in the front or back side of the display 220.

According to one embodiment, the calculation of the position of the mobile terminal 100 on the external display device 200 can be performed by a controller (not shown) of the external display device 200.

For example, the external display device 200 allows the NFC array antennas 230 arranged in the bezel region 210 thereof to receive the NFC signal transmitted from the mobile terminal 100 and it calculates the reception intensities of the signals, to calculate the position of the mobile terminal 100.

As shown in FIG. 6, when the mobile terminal 100 is positioned between X12 and X22 and between Y11 and Y21 out of the NFC array antennas 230 of the external display device 200, X12 and X22 receive the NFC signals transmitted from the mobile terminal 100 and measures the reception intensities of the signals, only to calculate a Y-axial position of the mobile terminal. Also, Y11 and Y21 receive the NFC signals transmitted from the mobile terminal 100 and the external display device 200 measures the reception intensities of the received signals, only to calculate the X-axial position of the mobile terminal 100.

Specifically, the controller of the external display device 200 compares the intensity of the NFC signal transmitted to X12 from the NFC device 114 with the intensity of the NFC signal transmitted to X22 from the NFC device 114. In the drawings, the mobile terminal 100 is positioned closer to X22 than the X12 and the intensity of the NFC signal received by X22 is larger than the intensity of the NFC signal received by X12. Based on the ratio of the signal intensities, the controller of the external display device can calculate an accurate position of the mobile terminal 100 on the external display device 200 in Y-axis direction. Optionally, the controller of the external display device 200 can calculate the distances according to the intensities of the NFC signals, respectively, and it can calculate the position of the mobile terminal 100.

The controller of the external display device 200 compares the intensity of the NFC signal transmitted to Y11 from the NFC device 114 of the mobile terminal 100 with the intensity of the NFC signal transmitted to Y21. After that, the controller can calculate an accurate position of the mobile terminal 100 on the external display device 200 in an X-axis direction. In the drawings, the mobile terminal 100 is positioned closer to Y11 than Y21 and the intensity of the NFC signal received by Y11 is larger than the intensity of the NFC signal received by Y21. Based on the ratio of the signal intensities, the controller of the external display device 200 can calculate an accurate position of the mobile terminal 100 on the external display device 200 in an X-axis direction. Optionally, the controller of the external display device 200 can calculate the distances according to the intensities of the NFC signals, respectively, and it can calculate the position of the mobile terminal 100.

The method for calculating the position of the mobile terminal is described above and detailed description thereof will be omitted for simplicity of the present specification.

According to one embodiment, the position of the mobile terminal 100 on the external display device 200 can be displayed on the display 220 of the external display device 200. As mentioned above, the sensitivity of the signal reception between the NFC array antenna 230 and the NFC device 114 is measured. Hence, the controller 180 of the mobile terminal 100 or the controller of the external display device 200 can calculate the position of the mobile terminal 100 on the external display device 200. For example, in case the controller 180 of the mobile terminal 100 calculates the position of the mobile terminal 100, the calculated position of the mobile terminal is transmitted to the external display device 200. At this time, a control signal configured to display the position of the mobile terminal 100 on the display 220 of the external display device 200 may be transmitted via the NFC device 114 together with the position of the mobile terminal 100. The external display device 200 receives the control signal and displays the position of the mobile terminal 100 according to the control signal. Optionally, the external display device 200 receives the calculated position of the mobile terminal 100 transmitted from the mobile terminal 100 via the NFC device 114 and the controller of the external display device 200 generates a control signal for controlling the calculated position on the display 220.

The method for calculating the position of the mobile terminal 100 on the external display device 200 is described above.

Next, a process of implementing the function corresponding to display information according to the position of the mobile terminal 100 on the external display device 200 will be described as follows.

Figure 7:
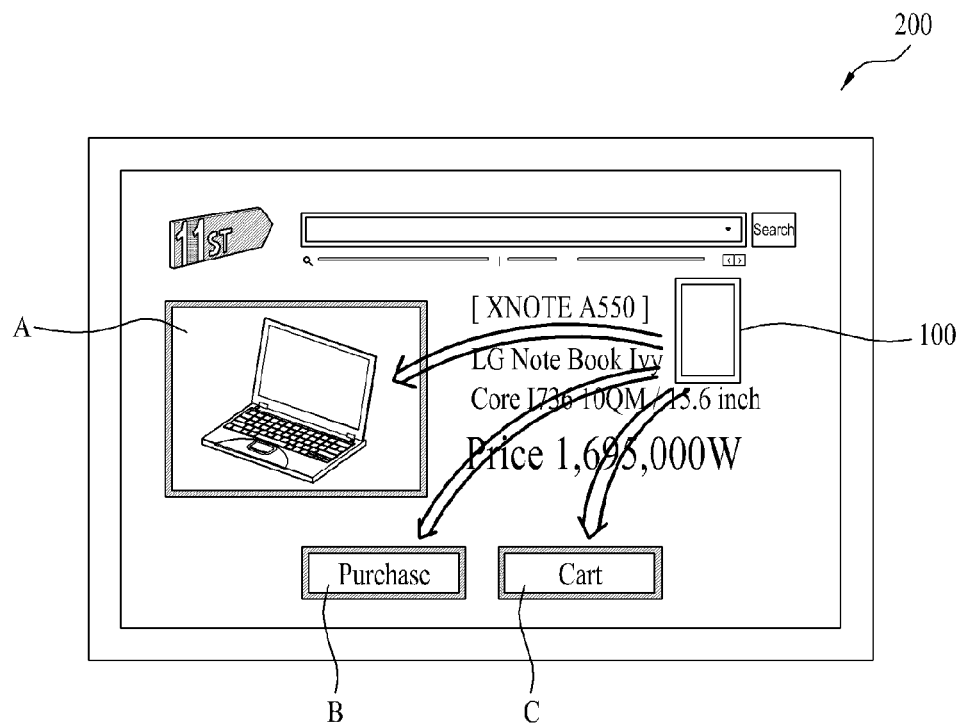
FIG. 7 is a diagram illustrating a function performed based on display information received by the mobile terminal according to one embodiment.
Figure 8:
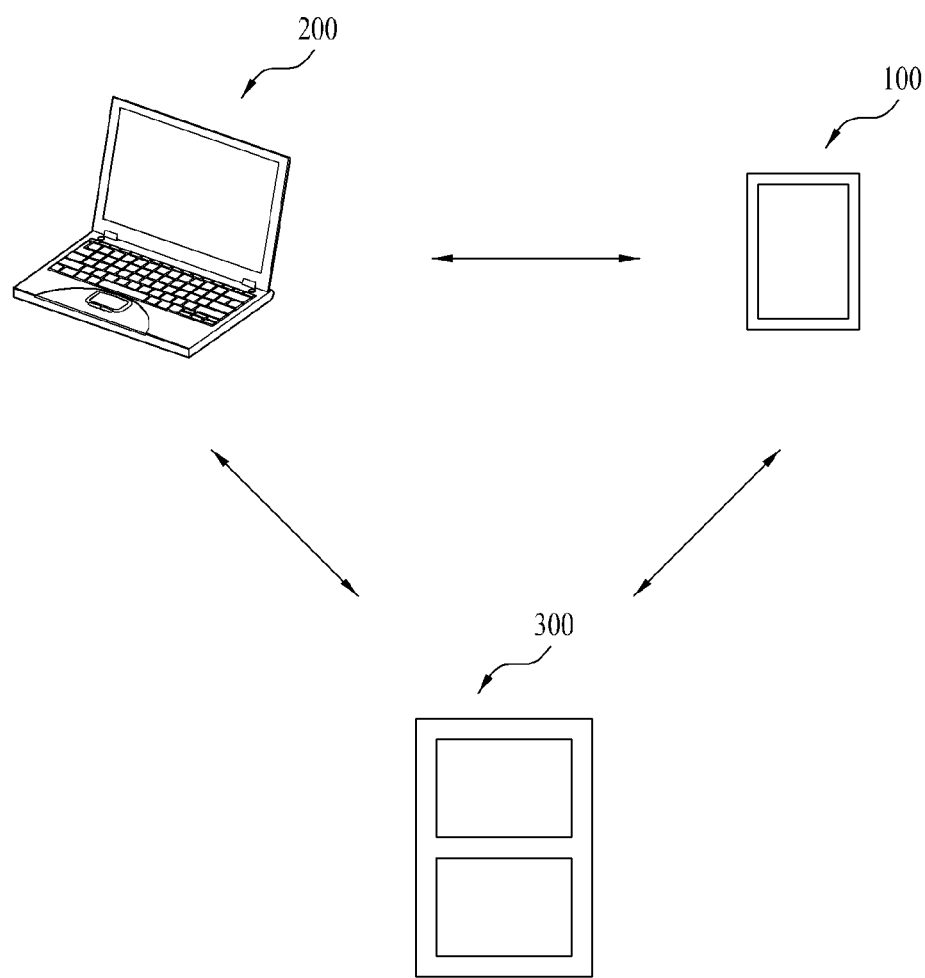
FIG. 8 is a diagram illustrating one example of a payment system according to one embodiment of the present invention.

FIG. 7 is a diagram illustrating a function performed based on display information received by the mobile terminal according to one embodiment. FIG. 8 is a diagram illustrating one example of a payment system according to one embodiment of the present invention.

In case the position of the mobile terminal 100 on the external display device 200 is calculated, the external display device 200 transmits display information corresponding to the calculated position. The controller 180 of the mobile terminal 100 may generate a control signal to implement a function according to the transmitted display information.

For example, the display information transmitted from the external display device 200 may include predetermined information for performing functions. Such function includes at least one of product information display, product payment and product information storage and the present invention is not limited thereto. According to one embodiment, the display information may include information for performing functions such as discount information display, free gift information display, comparison information with other products, screen display of a selected region and so on.

Referring to FIG. 7, in case the mobile terminal 100 is positioned on 'A' region of the external display device 200, the external display device 200 may transmit display information on the product on 'A' region to the mobile terminal 100. The mobile terminal 100 receives the display information on the product to display information on the product on the display 151. The user may determine whether to purchase the product after viewing the information displayed on the display 151 of the mobile terminal 100.

At this time, the display information on the product information transmitted to the mobile terminal 100 may be identical to an image on 'A' region of the external display device 200 and the present invention is not limited thereto. According to one embodiment, the display information transmitted to the mobile terminal 100 may be a changed one from an image displayed on the external display device 200 and it may be transmitted together with information including customer review, Q&A (questions and answers) on products. For example, when the mobile terminal 100 is positioned on 'A' region of the external display device 200, the external display device 200 may request a web server to send display information corresponding to 'A' region. The web server transmits the requested display information to the external display device 200 and the external display device 200 may transmit the received display information to the mobile terminal 100. At this time, in case the product information displayed on 'A' region of the external display device 200 is a photograph, the display information transmitted to the mobile terminal 100 may be a motion picture type of product information, for example. The user can get more information on the product after viewing the product information transmitted to the mobile terminal 100.

According to one embodiment, the user can gain desired information, while controlling the product information image displayed on the display 151 of the mobile terminal 100. Such controlling may include magnifying, reducing, moving and transition of the product information image.

When the mobile terminal 100 is positioned on 'B' region of the external display device 200, the external display device 200 may transmit predetermined information to implement a payment function of a product on 'B' region to the mobile terminal 100. The mobile terminal 100 receives the display information and displays information to determine whether to progress payment of the product. For example, a popup window for checking whether to process payment of the product may be displayed on the display 151 of the mobile terminal 100 and the present invention is not limited thereto. Accordingly, the user can progress product payment on the mobile terminal 100. At this time, the external display device 200 may transmit discount means such as coupons and mileage (or accumulating points for shopping) to the mobile terminal 100, together with the product payment information. Accordingly, the user can progress payment of the product easily on the mobile terminal 100.

Referring to FIG. 8, a payment system according to one embodiment of the present invention may include a mobile terminal 100, an external display device 200 capable of implementing NFC communication with the mobile terminal 100, and a payment server 300. When the mobile terminal 100 is positioned on 'B' region of the external display device 200, the mobile terminal 100 receives information configured to implement a product payment function. Once the user of the mobile terminal 100 selects to progress product payment, the mobile terminal 100 transmits a signal for requesting payment to the payment server 300 and the payment server 300 may transmit a payment authorization signal and a payment confirmation message to the mobile terminal 100. Credit cards, electronic money and various payment means issued in the mobile terminal 100 can be used.

At this time, payment information stored in the mobile terminal 100 can be used in the product payment process. For example, information on discounts, in other words, information on coupons and miles may be stored in the memory 160 of the mobile terminal 100. Using the discount information, the payment of the product can be progressed.

In other words, the controller 180 may search discount information on the coupon stored in the memory 160 and transmit information on the searched applicable coupon to the payment server 300. After that, the payment server 300 may apply a corresponding coupon and process the payment. Also, the controller 180 searches information on whether to accumulate miles on the memory 160. When mileage is possible, the controller 180 may transmit a signal of mileage accumulation to the payment server 300. After that, the payment server 300 may apply a corresponding mileage to the payment process and progress the payment process.

Referring to FIG. 7, when the mobile terminal 100 is positioned on 'C' region of the external display device 200, the external display device 200 may transmit display information to implement a function of storing information on a product on 'C' region to the mobile terminal 100. Information on the product may be transmitted to the mobile terminal 100 and stored in the memory 160 of the mobile terminal 100. The stored product information may include information on a name, price, photograph, motion picture, free gift, coupon of the product and the present invention is not limited thereto.

The product information stored in the memory 160 of the mobile terminal 100 may be searched on the memory 160 by the user easily at anytime, without an internet site linkage again. In addition, in case the stored product information includes plural pieces, the pieces of the information are displayed on a single screen to compare products with each other.

According to one embodiment, a region where NFC communication can be implemented with the mobile terminal 100 can be displayed and activated in the image displayed on the display 220 of the external display device 200. Specifically, in case the mobile terminal 100 is positioned in one of images displayed on the display 220 of the external display device 200, a region where display information can be transferred to the mobile terminal may be visually distinguished. In case the mobile terminal 100 is positioned in such a visually distinguished region where the NFC communication is implemented, the external display device 200 may transmit display information corresponding to the region to the mobile terminal. However, when the mobile terminal 100 is positioned in the other regions but the visually distinguished region where the NFC communication can be implemented, no operation is implemented between the external display device 200 and the mobile terminal 100.

For example, bold frame lines are displayed in A, B and C regions as shown in FIG. 7 and the NFC communication with the mobile terminal 100 is possible in those regions the user can figure out NFC communication implementable regions with the mobile terminal on the external display device 200 in advance. The user can locate the mobile terminal 100 on a desired region to gain desired information of the external display device 200.

The process of implementing functions corresponding to the position of the mobile terminal 100 on the external display device 200 is described above.

Next, a method for utilizing preset personal information transmitted to the external display device 200 from the mobile terminal 100 will be described as follows.

According to one embodiment, the NFC device 114 of the mobile terminal 100 may transmit preset personal information to the external display device 200.

The preset personal information may include past product purchase information, a past settlement list, membership information, membership card information, adult certification, mileage information, discount information, a category of preferred products and so on and the present invention is not limited thereto.

For example, when the mobile terminal 100 is position on A or B region corresponding to the product information of the external display device 200, information on the products purchased in the past may be transmitted to the external display device 206 from the mobile terminal 100. At this time, the controller 180 may search the same category of products as the products displayed on the external display device 200 currently and transmit the result of the search to the external display device 200. In other words, the controller 180 receives product information on A region of the external display device 200 and extracts a category of corresponding products from the name of the product. After that, the controller 180 searches on the past purchase product information stored in the memory 160 for corresponding products included in the same category of the received product information. Based on the result of the searching, in case there are products belonging to the same category displayed on the external display device 200 currently, the result of the searching can be transmitted to the external display device 200.

The external display device 200 may display the received past product purchase information on the display 220. The products purchased in the past are displayed together with the product displayed on the display 220 of the external display device 200. Accordingly, the user may compare the products purchased in the past and the currently displayed product with each other, to determine whether to purchase the product based on the result of the comparison. Also, it can be prevented that the user repeatedly purchases the same products. If the product is similar to the already purchased products, the product is compared with the purchased products and information on whether to purchase the product can be provided one more time.

In case mileage information, discount information and the like are stored in the memory 160 of the mobile terminal 100, that information may be transmitted to the external display device 200 to be used in the process of progressing the payment. The external display device 200 may transmit the received discount information and the like to the payment server 300. After that, the payment server 300 applies corresponding discount information to the payment process. Unless remembering all of the discount information in a purchasing process, the user can have a disadvantage of failing to receive a usable discount. However, when the information stored in the mobile terminal 100 is used in purchasing the product, discount information applicable to the product may be automatically applied and the user may inform the information, without remembering all of discount information. In addition, mile accumulation and usage can be provided to the user to get miles. If necessary, miles can be used.

Figure 9:
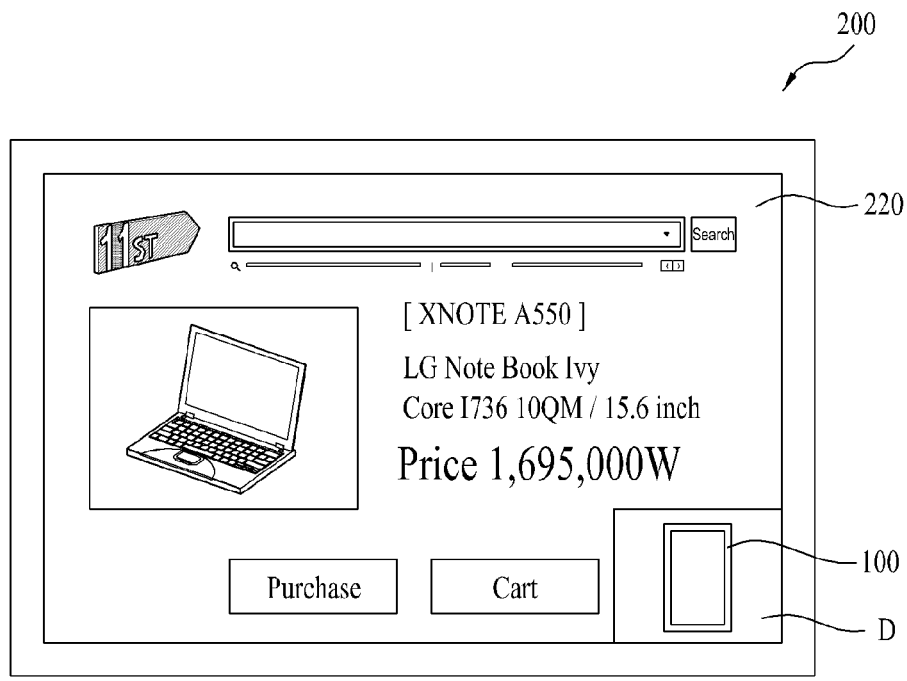
FIGS. 9 and 10 are diagrams illustrating that contents displayed on an external display device are changed according to personal information preset in the mobile terminal.
Figure 10:
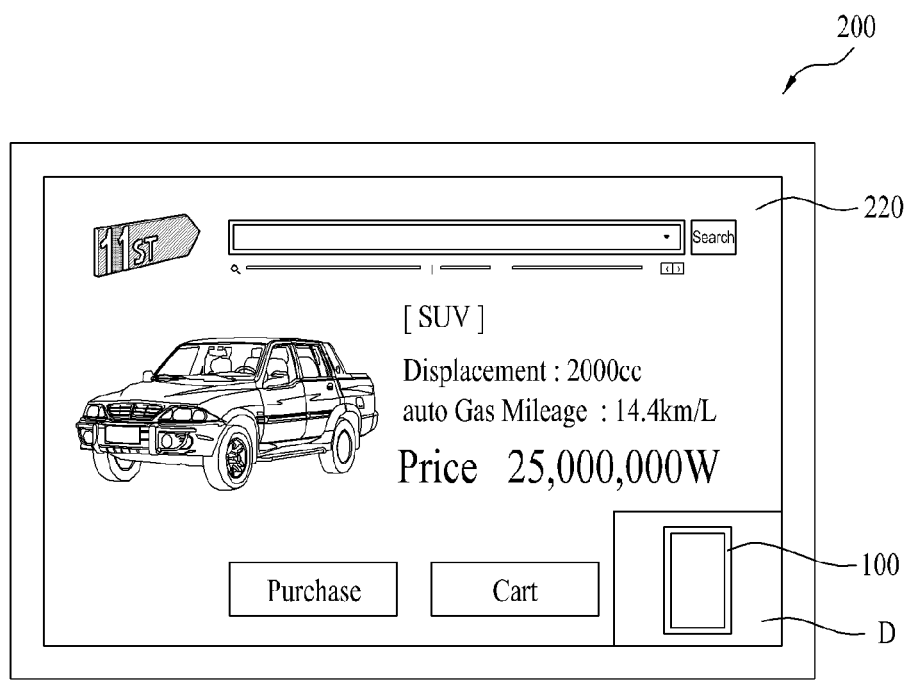

FIGS. 9 and 10 are diagrams illustrating that contents displayed on an external display device are changed according to personal information preset in the mobile terminal.

When the personal information preset in the mobile terminal 100 is transmitted to the external display device 200, the external display device 200 can change displayed contents fitted to the user. For example, as shown in FIG. 9, when the mobile terminal 100 is positioned in D region of the external display device 200, personal information on a category of products the user prefers may be transmitted to the external display device 200 via the NFC device 114 that is one of the short-range communication module. At this time, the external display device 200 receives the personal information on the category of the user preferring products and the displayed contents are changed into the product information on the user preferring product.

That is advantageous in case the external display device 200 is an advertising display device, for example, an outdoor advertising billboard. In a conventional advertising billboard, random advertisements are displayed to people watching the advertisements and efficiency of the advertisements is deteriorated. However, in one embodiment, the advertising display device receives the personal information from the mobile terminal 100 and changes displayed advertisement into new one. In other words, when the user positions the mobile terminal 100 in a predetermined region of the external display device 200, the external display device 200 receives the user's personal information from the mobile terminal 100 and changes the displayed advertisement into an advertisement for the product the user prefers.

In case of viewing and purchasing the contents of the changed advertisement, the user can position the mobile terminal 100 on a predetermined payment position of the external display device 200 to progress a payment of the product and to purchase the product immediately. In case the mobile terminal 100 is positioned on the product payment region of the external display device 200, the mobile terminal 100 may be connected to the payment server 300 as shown in FIG. 8 and the product payment can be in progress by the payment server 300.

The method for utilizing the personal information preset in the mobile terminal 100 by transmitting the personal information to the external display device 200 is described above.

Next, a method for capturing the image displayed on the external display device 200 will be described as follows.

FIGS. 11 to 14 are diagrams illustrating that an image displayed on the external display device is captured by the mobile terminal.

Figure 11:
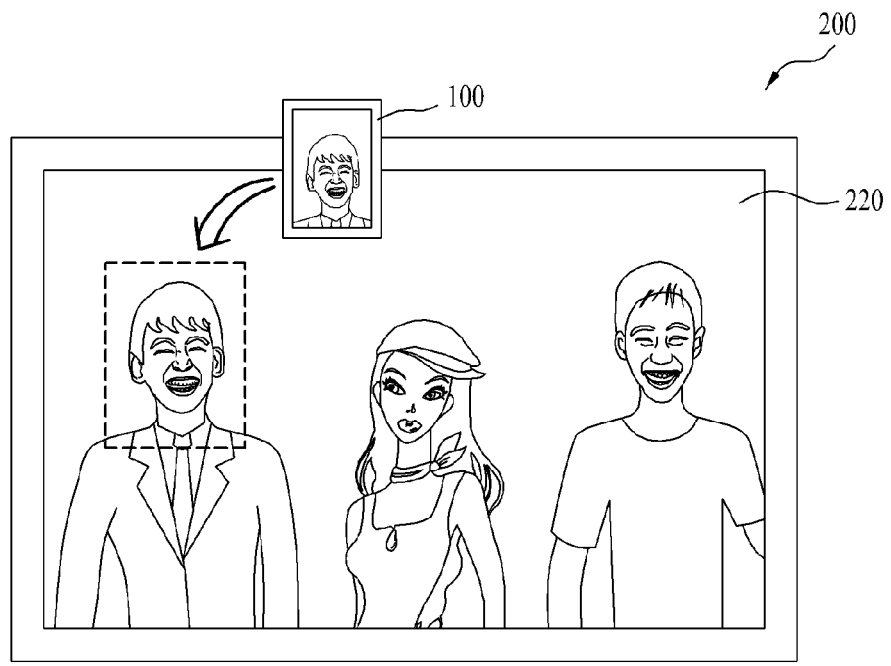

Referring to FIG. 11, the mobile terminal 100 can capture an image displayed on the display 220 of the external display device 200. The external display device 200 may transmit display information according to the position of the mobile terminal 100 to the mobile terminal 100. At this time, the display information transmitted to the mobile terminal 100 may be an image displayed on a region of the external display device 200 where the mobile terminal 100 is positioned. The mobile terminal 100 receives the display information and displays it on the display 151. The user may determine whether to capture the image displayed on the display 151 of the mobile terminal 100. An auxiliary popup window may be displayed to determine whether to capture the image displayed thereon. At this time, in case the display 151 includes the touch sensor 137, the user may partially touch the display 151 with a pointer to implement capturing.

Figure 12:
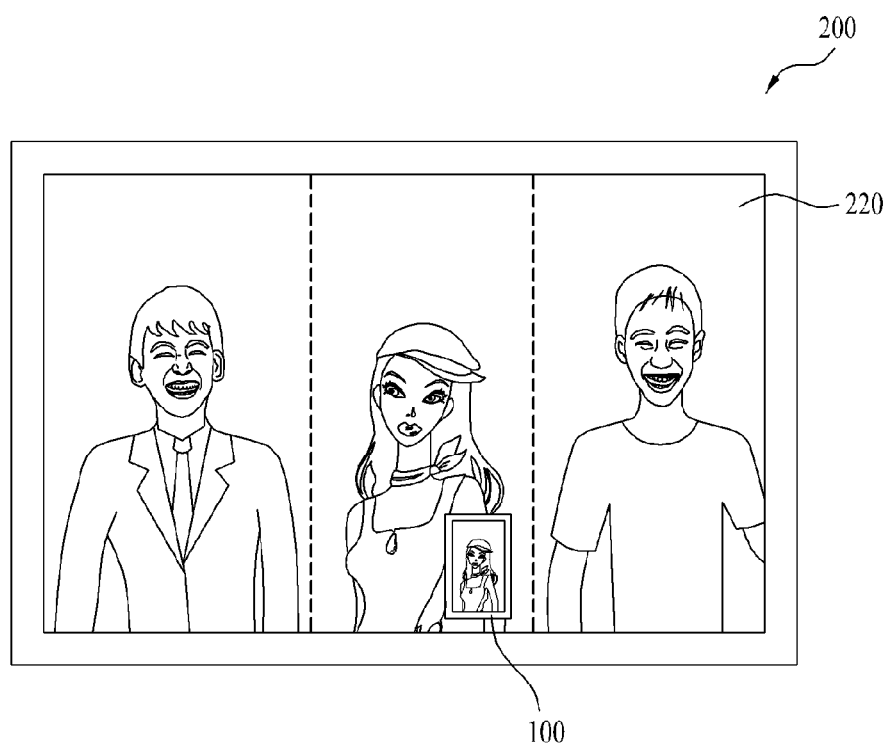

Only an image on the region corresponding to the calculated position of the mobile terminal 100 on the external display device 200 may be transmitted to the mobile terminal 100 or an entire image displayed on the display 220 of the external display device 200 may be transmitted to the mobile terminal 100. Optionally, after the display 220 of the external display device 200 is divided into a plurality of region as shown in FIG. 12, the image on the region corresponding to the calculated position may be the image on one of the divided regions where the mobile terminal 100 is positioned. At this time, the position of the mobile terminal 100 on the external display device 200 is displayed on the display 220 of the external display device 200 and the user can check the region which will be captured on the external display device 200.

The user views the image displayed on the display 151 of the mobile terminal 100 and determines whether to capture the image or not. The user can select the image to capture, while moving the mobile terminal 100 on the external display device 200. At this time, the user may capture the image displayed on the display 151 of the mobile terminal 100 or adjust the image before capturing it. For example, the image displayed on the display 151 may be reduced as shown in FIG. 13 (*a*) and the size-adjusted image may be captured as shown in FIG. 13 (*b*).

As shown in FIG. 14 (*a*), the user may determine a region to capture, while moving the position of the mobile terminal 100 on the external display device 200.

For example, a start point (1) and a finish point (2) are selected on the external display device 200 by using the mobile terminal 100. A region surrounding the start point (1) and the finish point (2) may be designated as a region (D) which will be captured. At this time, an input window 1301 for selecting the start point (1) and the finish point (2) of the region to capture (D) may be displayed on the mobile terminal 100 as shown in FIGS. 14 (*b*) and (*c*). The user positions the mobile terminal 100 at the start point (1) of the region to capture on the external display device 200, to select 'start point' of the input window 1301 as shown in FIG. 14 (*b*). After the selection of the start point (1), the finish point (2) of the region to capture (D) may be designated and the controller 180 may change the displaying of the input window 1301 into 'finish point' as shown in FIG. 14 (*c*). According to one embodiment, a start point selecting button and a finish point selecting button may be displayed on the input window 1301. The user positions the mobile terminal 100 on the finish point (2) of the region to capture and selects 'finish point' of the input window 1301, only to designate the finish point of the region to capture (D). The controller 180 calculates the region to capture (D) according to input signals of the start point (1) and the finish point (2) input to the input window 1301 and then it implements the capture with respect to the region to capture (D).

The captured image may be stored in the memory 160 of the mobile terminal 100 or transmitted to another mobile terminal.

The method for capturing the image displayed on the external display device 200 by using the mobile terminal 100 is described above.

Next, function implementation according to the display information of the mobile terminal when the mobile terminal 100 performing another function receives the display information will be described as follows.

Figure 15:
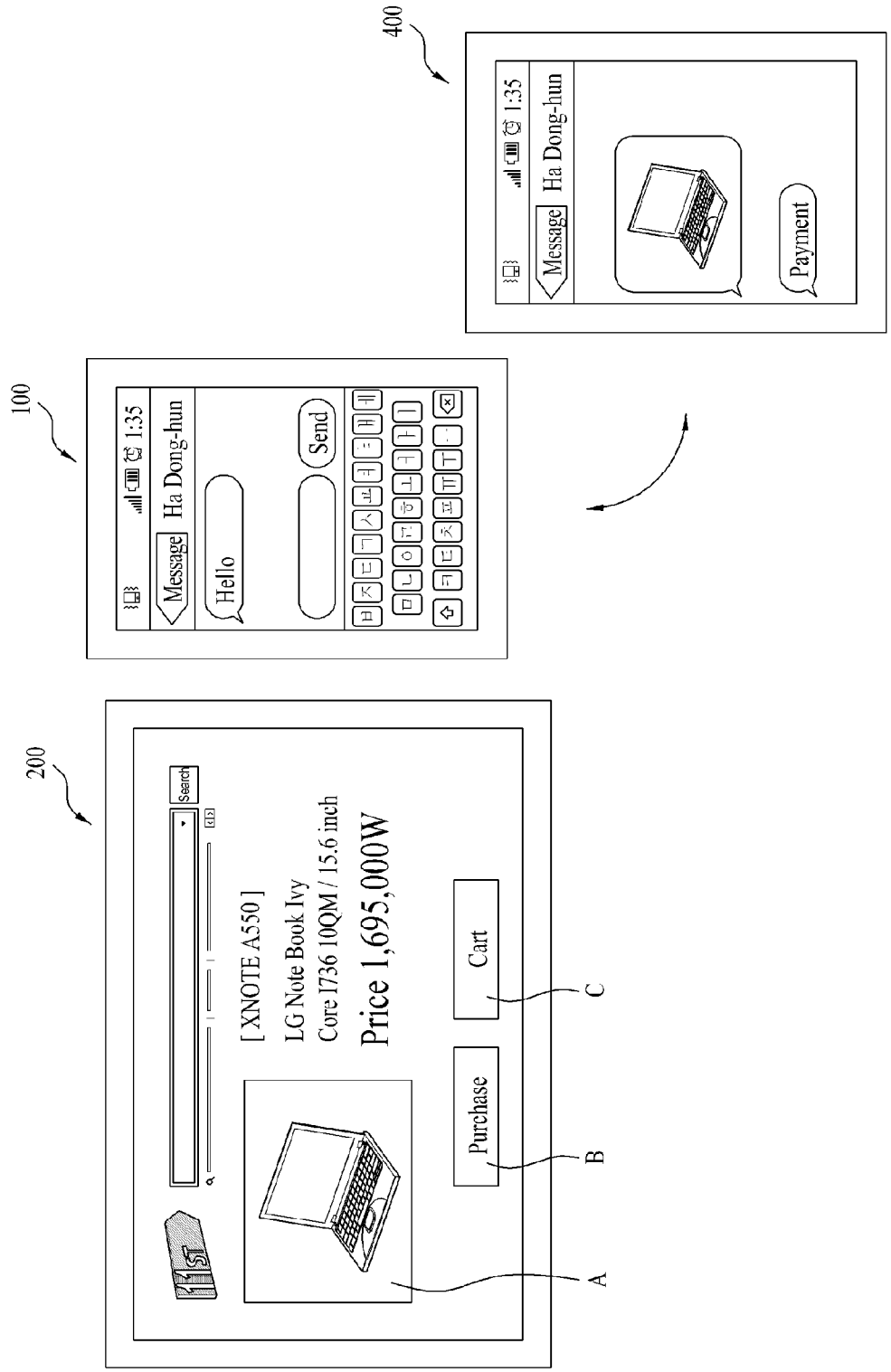
FIGS. 15 to 17 are diagrams illustrating function performance according to the display information of the mobile terminal, in case the mobile terminal receives display information during the process of performing another function.
Figure 16:
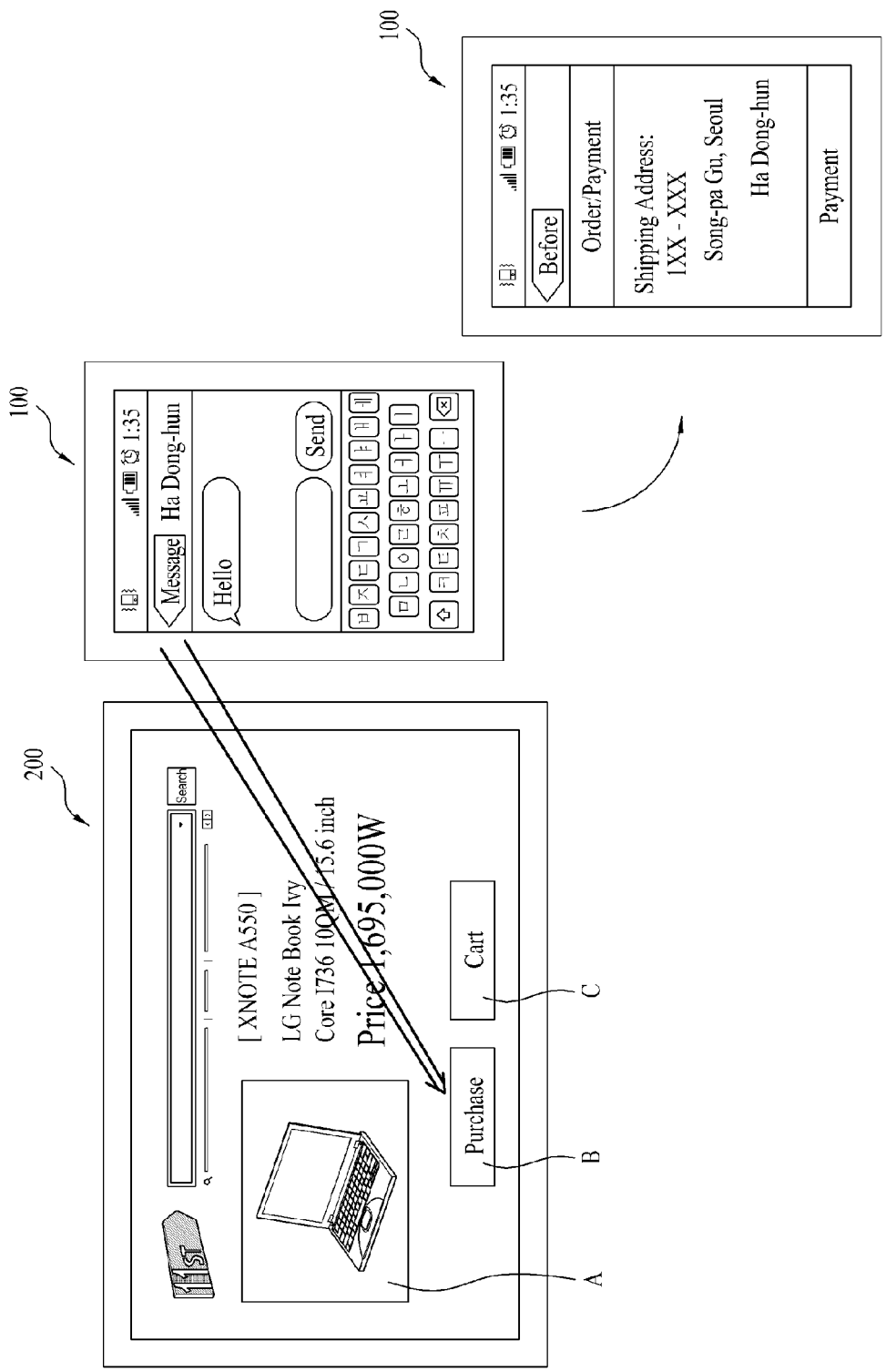
Figure 17:
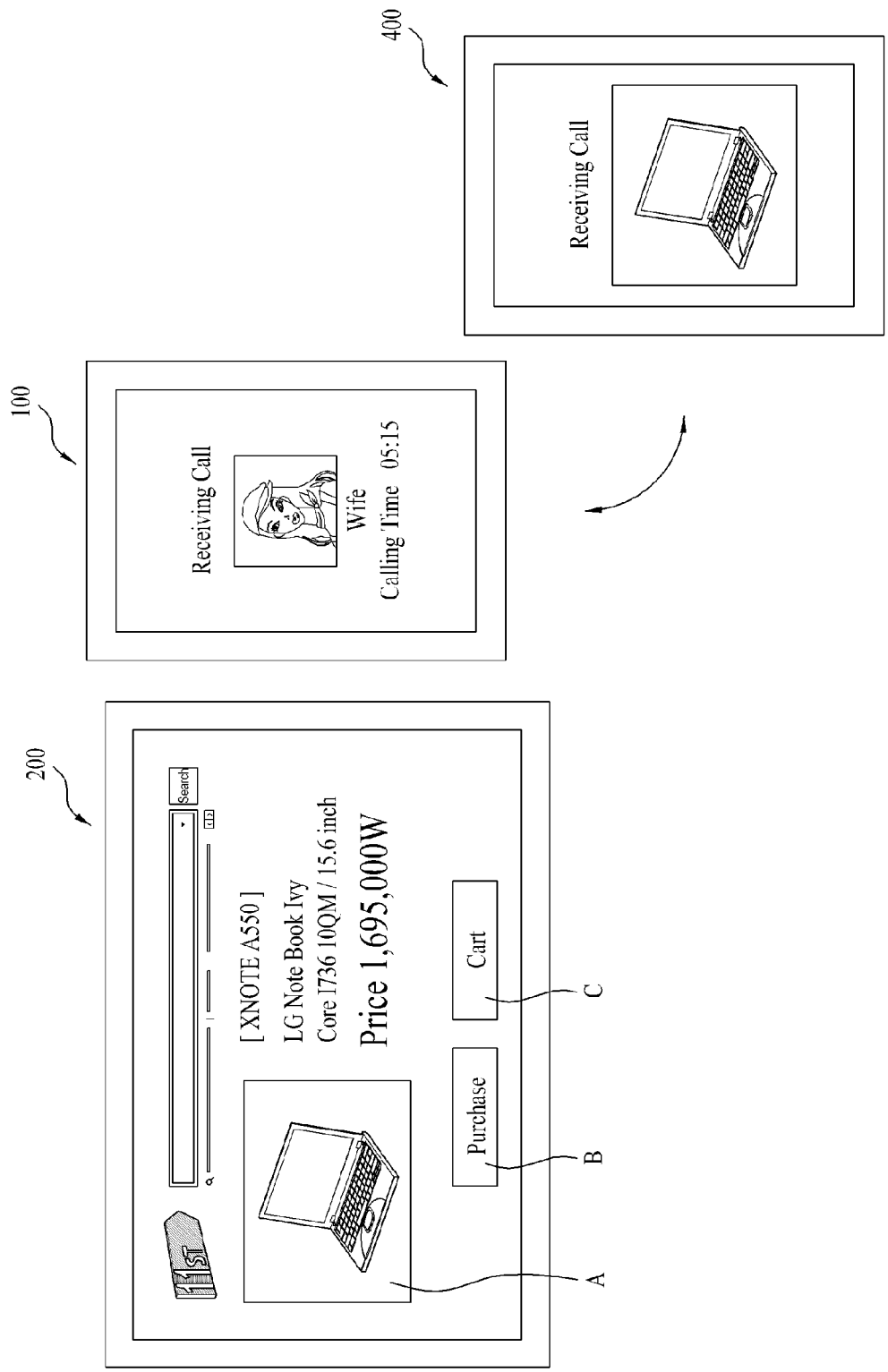

FIGS. 15 to 17 are diagrams illustrating function performance according to the display information of the mobile terminal, in case the mobile terminal 100 receives display information during the process of performing another function.

The function implementation according to the display information transmitted from the external display device 200 may be differentiated according to the function that is under implementation at the point when the mobile terminal 100 receives the display information.

Referring to FIG. 15, while a message screen is displaying as a message function is implemented on the mobile terminal 100, the user positions the mobile terminal 100 on the external display device 200 and the mobile terminal 100 receives display information corresponding to the position of the mobile terminal from the external display device 200. Such a message function may include Short Message Service (SMS), MMS (Multimedia Messaging Service), e-mail, Instant Message, SNS (Social Network Service) and address book and the present invention is not limited thereto.

Referring to FIG. 15, in case the mobile terminal 100 is positioned on a product information region (A) of the external display device 200 during the implementation of the SMS function, display information on a product may be transmitted to the mobile terminal 100 from the external display device 200. At this time, the opposite party that will be provided with the display information has to be selected specifically. For the SMS function, the opposite party is selected and a message input window is activated and the controller 180 may transmit the display information to a mobile terminal 400 possessed by the opponent party in SMS type, in case the mobile terminal 100 is positioned on the external display device 200.

Even in case the mobile terminal 100 is positioned on the external display device 200 on an address book screen, product information may be transmitted to the mobile terminal 400 of the opposite party on the address book. In this instance, a specific one is selected from the address book screen and the mobile terminal 100 is positioned on the external display device 200 in a state where information on the opponent party is displayed. In this state, the display information may be transmitted to the mobile terminal 400 of the selected opposite party.

Accordingly, the opposite party who desires to know information on the product may be provided with accurate product information. The opposite party can view the product information and determine whether to purchase the product.

In case the mobile terminal 100 is positioned on a product payment region (B) of the external display device 200 while a message screen is displayed on the mobile terminal 100 according to the message function implementation, display information on product payment may be transmitted to the mobile terminal 100 from the external display device 200. At this time, the controller 180 of the mobile terminal 100 may transmit payment information to a mobile terminal 400 possessed by the other party of the message function. The transmitted display information may include product information. The opposite party may view the received payment information and progress the payment of the product on his or her mobile terminal 400.

According to one embodiment, if an address of the opposite party of the SMS is listed on the address book in case the product payment is progressed in the mobile terminal 100 of the opposite party during the implementation of the SMS function as shown in FIG. 16, the address of the opposite party of the SMS is selected and transmitted to the payment server 300 as shipping address. In case the mobile terminal 400 is positioned on the external display device 200 from the address book screen, the controller 180 may transmit the product payment information to the opposite party listed on the address book or the address of the opposite party may be designated as shipping address.

Referring to FIG. 17, the mobile terminal 100 is positioned on the display device 200 during a voice call and display information corresponding to the position of the mobile terminal 100 may be transmitted to the mobile terminal 100 from the external display device 200. As shown in FIG. 17, in case the mobile terminal 100 is positioned at a product information region (A) of the external display device 200 during a voice call, display information on the product information may be transmitted to the mobile terminal 100 from the external display device 200. The controller 180 of the mobile terminal 100 receives the display information of the product information and transmits the display information to the opposite party of the voice call. Even in case the mobile terminal 100 is positioned on the external display device 200 during a video call, the controller 180 may transmit product information to the opposite party of the video call. Accordingly, the user viewing the information on the product may inform the accurate product information the opposite party desires to see and the opposite part of the video call may view the transmitted information on the product and determine whether to purchase the product.

In case the mobile terminal 100 is positioned on the product payment region (B) of the external display device 200 during the voice call, display information of product payment may be transmitted to the mobile terminal 100 from the external display device 200. At this time, the controller 180 of the mobile terminal 100 may transmit payment information to the mobile terminal 400 possessed by the opposite part of the voice call. The transmitted display information may include product information. The opposite party of the voice call may view the received payment information and progress the payment of the product on the mobile terminal 400 according to the payment information.

Although not shown in the drawings, according to one embodiment, in case the product payment is progressed on the mobile terminal 100 during the voice call and the address of the opposite party of the voice call is on the list of the address book, the controller 180 may select the address of the opposite party of the voice call as shipping address automatically and transmit the address to the payment server 300. The payment server 300 may progress the payment based on the payment information transmitted from the mobile terminal 100.

Even in case the user positions the mobile terminal 100 on the external display device 200 during a video call, the control 180 may transmit the product payment information to the opposite party of the video call or designate the address of the opposite part as shipping address. As the user of the mobile terminal 100 and the opposite party are on the voice or video call, the user may get the opposite party's agreement immediately on purchase of the product displayed on the external display device 200. Accordingly, once getting the agreement, the user may progress payment and make the address of the opposite party of the call registered on the list of the address book designated as shipping address automatically or transmit the payment information to the opposite party to make the opposite party progress the payment on the opposite party's mobile terminal.

The function implementation according to the display information of the mobile terminal 100, in case the mobile terminal 100 receives the display information while implementing another function is described above.

Next, control for the external display device 200 according to a moved position of the mobile terminal 100 by tracing and calculating the position of the mobile terminal 100 will be described as follows.

Figure 18:
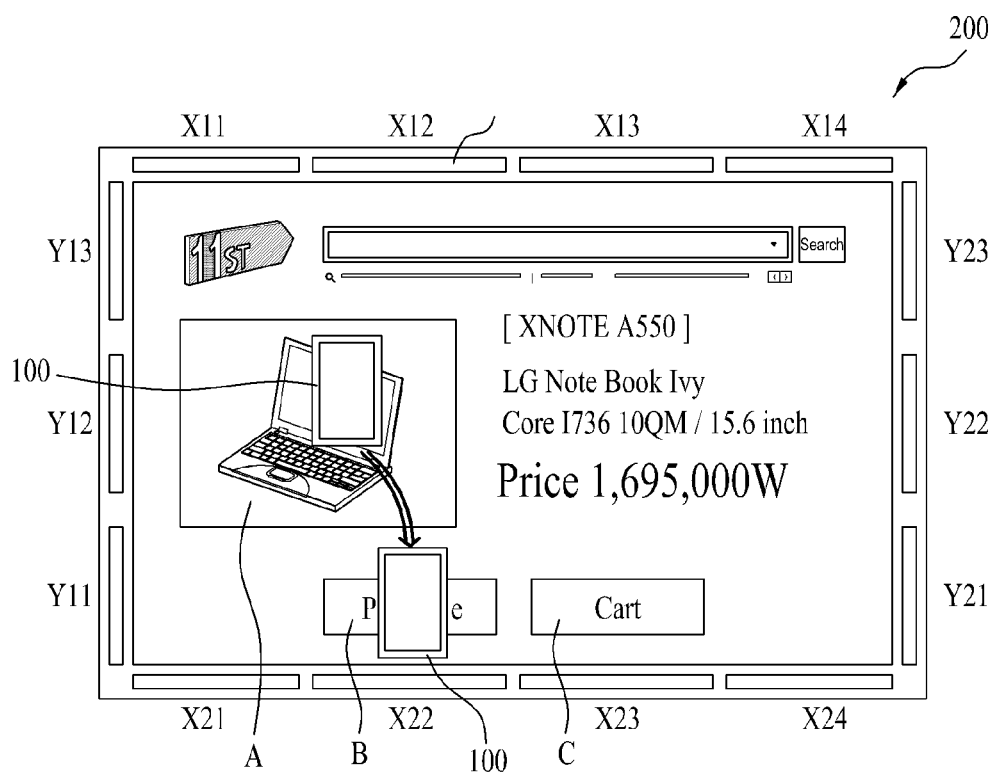
FIG. 18 is a diagram illustrating a process of tracing and calculating the position of the mobile terminal.

FIG. 18 is a diagram illustrating a process of tracing and calculating the position of the mobile terminal.

Referring to FIG. 18, in case the position of the mobile terminal 100 is moved from A region to B region on the external display device 200, the position of the mobile terminal 100 may be traced and calculated based on variation of reception sensitivity of the NFC signals transmitted from the NFC array antenna 230 of the external display device 200.

For example, when the mobile terminal 100 is positioned on A region, the NFC signal transmitted from X11 and Y12 out of the NFC array antennas 230 arranged in the bezel region 210 formed in the outer circumferential surface of the external display device 200 is received by the mobile terminal 100 with the strongest intensity. The controller 180 of the mobile terminal 100 may calculate that the mobile terminal 100 is positioned on A region of the external display device 200 from the received NFC signal. At this time, the mobile terminal 100 is moved from A to B, the reception sensitivity of the NFC signals transmitted from X11 and Y12 is decreased and the reception sensitivity of the NFC signals transmitted from X23 and Y21 is getting increased out of the NFC array antennas 230 of the external display device 200. Accordingly, the controller 180 of the mobile terminal 100 can trace that the mobile terminal 100 is moved from A region to B region on the external display device 200 and it may calculate a final position of the mobile terminal 100.

According to one embodiment, the position tracing and calculating of the mobile terminal 100 may be implemented by the controller of the external display device 200. In other words, when the mobile terminal 100 is positioned on A, the reception sensitivity of the NFC signals is the highest on X11 and Y12 out of the NFC array antennas 230 of the external display device 200, such that it is expected that the mobile terminal 100 is positioned on A region of the external display device 200. At this time, when the mobile terminal 100 is moved from A to B, the reception sensitivity of the NFC signals transmitted from the NFC device 141 of the mobile terminal is decreased on X11 and Y12 and increased on X23 and Y21, such that it is expected that the mobile terminal 100 is moved from A region to B region and that a final position of the mobile terminal 100 may be calculated.

FIGS. 19 (a) and 19 (b) is a diagrams illustrating an example of a method for controlling an external display device by a mobile terminal based on position variation tracing with respect to the mobile terminal.

According to one embodiment, the position of the mobile terminal 100 is tracing on the external display device 200 and the external display device 200 may be then controlled by using the mobile terminal. In other words, the position of the mobile terminal 100 may be calculated on the external display device 200. When the position of the mobile terminal 100 is changed, a passage of position change can trace. At this time, a screen displayed on the external display device 200 may be magnified, reduced, moved and changed according to the passage of the position change. For example, as shown in FIGS. 19(a) and 19(b), in case the mobile terminal 100 is flicking on the external display device 200, the screen displayed on the external display device 200 may be rotated. Rather than this case, the image displayed on the external display device 200 is a specific photograph of a product and then a lateral view or back view of the product may be seen.

Although not shown in the drawings, when a specific shape is drawn by using the mobile terminal 100, a screen displayed on the display 220 of the external display device 200 may be magnified or reduced. The entire screen displayed on the display 220 of the external display device 200 is moved in up/down and right/left directions, only to make a not-displayed portion visible on the external display device 200.

At this time, the controller 180 generates a control signal for switching the screen of the external display device 200 by recognizing the operation of the mobile terminal 100. The controller 180 of the mobile terminal 100 may trace a position change passage of the mobile terminal 100 on the external display device 200 and transmit a control signal for adjusting the screen displayed on the external display device 200 to the external display device 200. The external display device 200 may receive the control signal and change the displayed contents according to the control signal. Optionally, the controller of the external display device 200 may trace the position change passage of the mobile terminal 100 and calculate the operation of the mobile terminal 100 according to the traced position change passage. The controller 180 may generate a control signal for changing the contents displayed on the display 220 of the external display device 200.

Although not shown in the drawings, product payment may be implemented by a picture drawn by moving of the mobile terminal 100. For example, when the user draws a circle with the mobile terminal 100 in a state of displaying the product payment information on the display 151 of the mobile terminal 100, information pre-stored in the mobile terminal 100 for payment may be automatically transmitted to the payment server 300 to progress the payment. Optionally, in case the user is moving the mobile terminal 100 with drawing X with, the drawn X may be recognized as a command for product payment cancel.

As shown in FIG. 1, the mobile terminal 100 according to one embodiment may further include a proximity sensor 141. The proximity sensor 141 may sense the mobile terminal 100 moving close to or distant from the external display device 200. At this time, in case the mobile terminal 100 is moving close to the external display device 200, the controller 180 may generate a control signal for magnifying the image displayed on the display 151. Alternatively, in case the mobile terminal 100 is moving distant from the external display device 200, the controller 180 may generate a control signal for reducing the image displayed on the display 151.

Specifically, in case of desiring to see detailed parts of the product displayed on the display 151 by magnifying the image of the product, the user of the mobile terminal 100 may move the mobile terminal 100 close to the external display device 200. Once the mobile terminal 100 is moved close to the external display device 200, the proximity sensor 141 of the mobile terminal 100 can detect that the mobile terminal 100 is moving close to the external display device 200. When recognizing the mobile terminal 100 moving near the external display device 200 via the proximity sensor 141, the controller 180 of the mobile terminal 100 may generate a control signal for magnifying display information corresponding to the calculated position of the mobile terminal on the external display device 200 and displaying the magnified image. (not shown in drawings)

In contrast, in case of desiring to see an entire view of the product displayed on the display 151 by reducing the image of the product, the user of the mobile terminal 100 may move the mobile terminal 100 distant from the external display device 200. Once the mobile terminal 100 is moved distant from the external display device 200, the proximity sensor 141 of the mobile terminal 100 can detect that the mobile terminal 100 is moving distant from the external display device 200. When recognizing the mobile terminal 100 moving farther from the external display device 200 via the proximity sensor 141, the controller 180 of the mobile terminal 100 may generate a control signal for reducing display information corresponding to the calculated position of the mobile terminal on the external display device 200 and displaying the reduced image.

Moreover, the proximity sensor 141 of the mobile terminal 100 may be controlled to capture a predetermined part or an entire part of the contents displayed on the external display device 200 by magnifying or reducing a screen to capture. In other words, when the mobile terminal 100 is moved close to the external display device 200, the controller 180 may generate a control signal for magnifying display information corresponding to the calculated position of the mobile terminal 100 on the external display device 200 and for displaying a magnified image on the display 151. In contrast, when the mobile terminal 100 is moved distant from the external display device 200, the controller 180 may generate a control signal for reducing display information corresponding to the calculated position of the mobile terminal 100 on the external display device 200 and for displaying a reduced image on the display 151. The user may select a region to capture by magnifying or reducing the displayed screen.

The controlling of the external display device 200 according to the moved position of the mobile terminal by tracing and calculating the position of the mobile terminal 100 is described above.

Next, function implementation according to display information based on alignment of the mobile terminal 100 will be described as follows.

Figure 20:
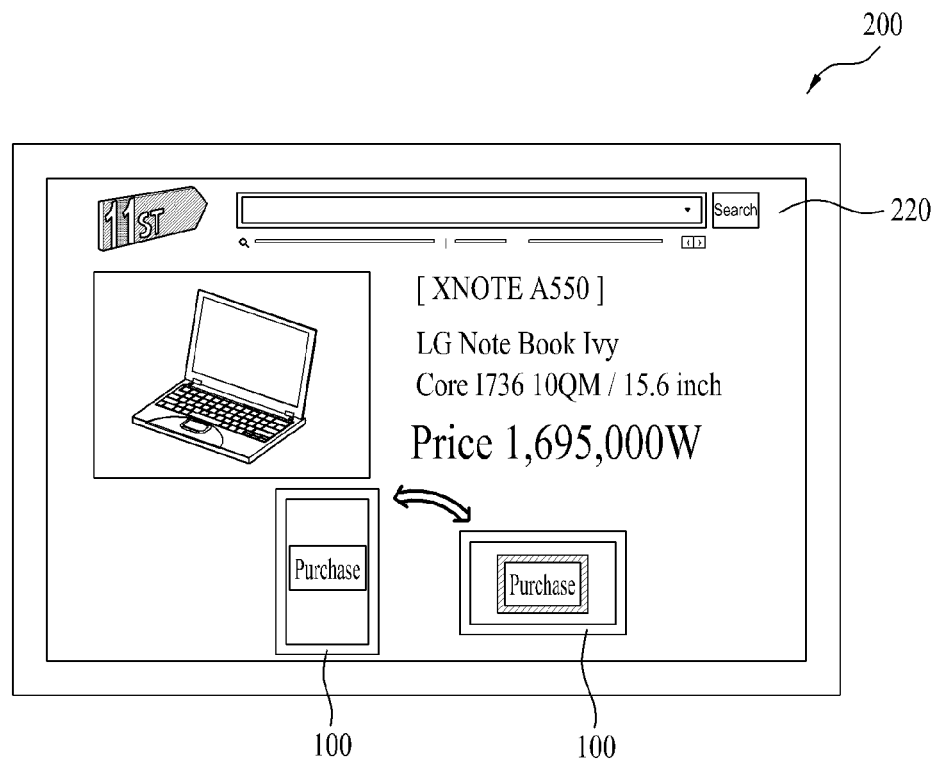
FIGS. 20 and 21 are diagrams illustrating function performance based on display information received according to a horizontal/vertical state of the mobile terminal.
Figure 21:
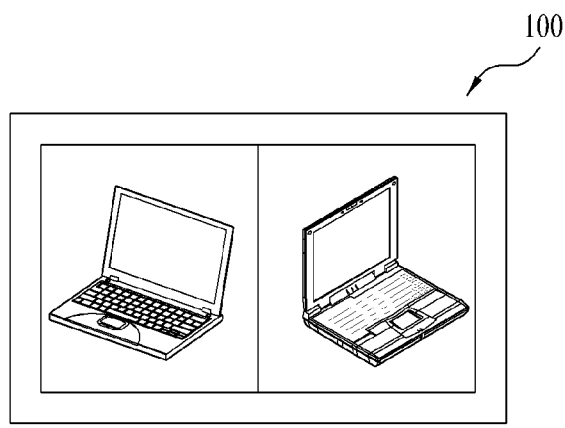

FIGS. 20 and 21 are diagrams illustrating function performance based on display information received according to a horizontal/vertical state of the mobile terminal.

The mobile terminal may further include a sensing unit 140 for sensing a horizontal and vertical arrangement state of the mobile terminal 100. At this time, the controller 180 may be configured to implement a function in a horizontal arrangement and a different function in a vertical arrangement. According to one embodiment, the controller 180 is configured to implement a preset function according to the display information transmitted to the mobile terminal 100 in case the mobile terminal 100 is in preset one of the horizontal and vertical arrangement states. The sensing unit 140 may include a gyro-sensor or a gravity sensor that is able to determine the arrangement state of the mobile terminal 100.

For example, in case the mobile terminal 100 is positioned on a product payment region of the external display device 200 as shown in FIG. 20, a product payment function may not be activated in the vertical arrangement state of the mobile terminal 100.

That is, in the memory 160 may be stored information configured not to implement the product payment function transmitted from the external display device 200 in the vertical arrangement state of the mobile terminal 100. The controller 180 checks whether the display information transmitted from the external display device 200 is configured to implement the product payment function and generates a signal configured not to implement the product payment function. For example, in the vertical state of the mobile terminal 100, product information checking or screen scanning is possible and product payment is not activated. A payment window is configured to be activated only when the alignment of the mobile terminal 100 is switched. In this instance, wrong payment that might be generated by malfunction of the mobile terminal 100 can be prevented.

In case the mobile terminal 100 is in a horizontal state as shown in FIG. 20, the controller 180 may implement a function according to the transmitted display information. For example, when the display information transmitted to the mobile terminal 100 includes a product payment function, the product payment function can be implemented in a state where the mobile terminal 100 is in the horizontal state. When the mobile terminal 100 is switched to be in the vertical state, a control signal configured not to implement the product payment function may be generated.

Although not shown in the drawings, the controller 180 may control the product information recognized in the vertical state of the mobile terminal 100 to be stored in the memory 160 of the mobile terminal 100 when the vertical state of the mobile terminal 100 is switched into the horizontal state. The product information can be easily stored in the memory only by switching the alignment of the mobile terminal 100, with no auxiliary storage signal inputted to the mobile terminal 100.

As shown in FIG. 20, in case the alignment of the mobile terminal 100 is switched into the horizontal state, at least one of the products stored in the memory 160 of the mobile terminal 100 may be displayed on the display 151 of the mobile terminal 100, together with the product displayed on the external display device 200 (see FIG. 21). The user may compare two or more products on one screen, to determine whether to purchase the products displayed on the external display device 200.

Although not shown in the drawings, in case the alignment of the mobile terminal 100 is in the horizontal state, the controller 180 may transmit a control signal to the external display device 200 to control the product displayed on the external display device 200 to be flicked to a product in the next page. With no auxiliary signal inputted to the external display device 200 by the user, the contents displayed on the external display device 200 can be switched simply by changing of the alignment of the mobile terminal 100. At this time, when the alignment of the mobile terminal 100 is changed into the vertical state again, the page on the external display device 200 may be flicked to return to the prior page or to go to the next page.

The implementation of the function according to the display information based on the alignment of the mobile terminal 100 is described above.

Next, another arrangement type of the NFC array antennas 230 of the external display device 200 will be described as follows.

Figure 22:
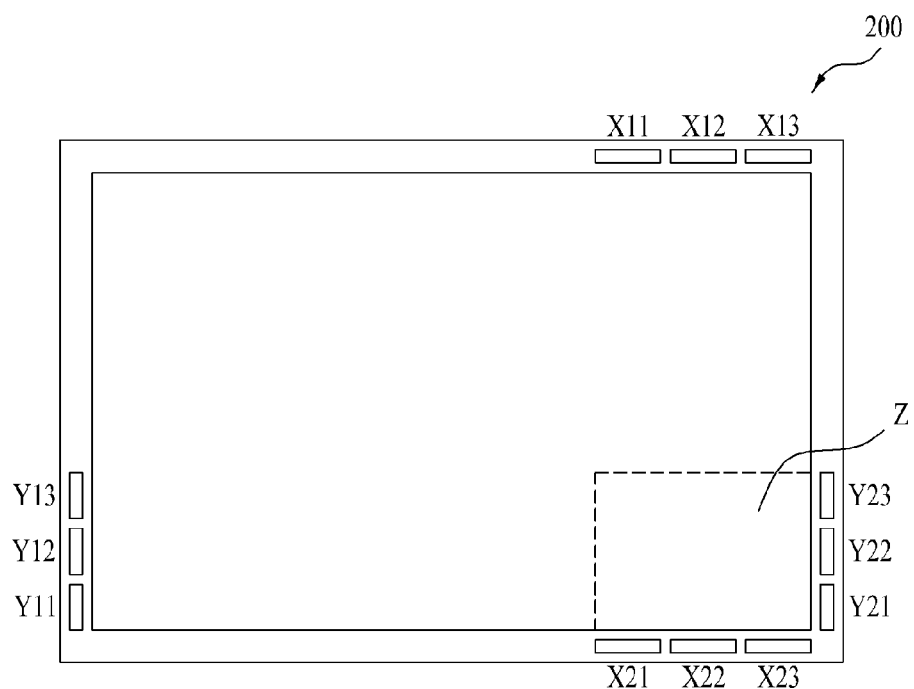
FIG. 22 is a diagram illustrating arrangement of a NFC array antenna provided in an external display device according to one embodiment.

FIG. 22 is a diagram illustrating arrangement of a NFC array antenna provided in an external display device according to one embodiment.

Referring to FIG. 22, the NFC array antenna 230 may be arranged only a predetermined portion of the bezel region 210 of the external display device.

For example, as shown in FIG. 22, NFC array antennas may be arranged in a right lower portion and a left lower portion corresponding thereto with respect to the external display device 200, to activate NFC in case the mobile terminal 100 is positioned on Z region in a right lower portion of the external display device 200. For example, when the mobile terminal 100 is positioned in Z region of the external display device 200 in FIG. 22, three NFC array antennas may be arranged in the bezel region on right side (Y21, Y22 and T23) and a lower side (X21, X22 and X23) of Z region on the external display device 200, respectively, for the NFC communication. In addition, three NFC array antennas (Y11, Y12 and Y13) are arranged in the bezel region facing the right side NFC array antennas (Y21, Y22 and Y23). Three NFC array antennas (X11, X12 and X13) may be arranged in the bezel region facing the lower side NFC array antennas (X21, X22 and X23). At this time, a plurality of NFC array antennas may be arranged on each of the sides or one NFC array antenna may be arranged on one side.

The NFC array antennas 230 are arranged and the position of the mobile terminal 100 may be calculated in case the mobile terminal 100 is position on Z region of the external display device 200.

Specifically, when the mobile terminal 100 is positioned in Z region, the mobile terminal receives NFC signals transmitted from array antennas X11, X12, X13, X21, X22, X23, Y11, Y12, Y13, Y21, Y22 and Y23 of the external display device 200. The controller 180 of the mobile terminal 100 measures the sensitivity of the NFC signals received from X11, X12, X13, X21, X22 and X23 antennas and it calculates a Y-axial position of the mobile terminal 100 on Z region based on the measured sensitivity. Also, the mobile terminal 100 measures the sensitivity of the NFC signals received from Y11, Y12, Y13, Y21, Y22 and Y23 antennas and calculates an X-axial position of the mobile terminal 100 on Z region. Optionally, the NFC device 114 of the mobile terminal 100 transmits NFC signals and X11, X12, X13, X21, X22, X23, Y11, Y12, Y13, Y21, Y22 and Y23 NFC array antennas of the external display device 200 receive the NFC signals. The signal reception sensitivity may be measured and the position of the mobile terminal 100 may be calculated based on the measured signal reception sensitivity. The detailed description of the position calculation of the mobile terminal 100 on the external display device 200 is mentioned above and it will be omitted accordingly.

In case the NFC array antennas 230 are arranged in a predetermined portion of the bezel region 210 formed in the external display device 200, the number of the NFC array antennas can be reduced and NFC communication can be implemented between the external display device 200 and the mobile terminal 100 simultaneously. In case the mobile terminal 100 is positioned in a NFC communication implementable region, display information corresponding to such a NFC communication implementable region is transmitted to the mobile terminal 100 and the controller 180 of the mobile terminal 100 implements a function according to the transmitted display information. Especially, when the external display device 200 is large-sized, the mutual operation between the mobile terminal 100 and the external display device 200 can be implemented even with a partial region where the NFC communication is possible without making the entire region of the external display device 200 NFC-communication-implementable.

Another arrangement type of the NFC array antennas 230 of the external display device 200 is described above.

Control for the external display device 200 or the mobile terminal 100 according to the position of the mobile terminal 100 on the external display device 200 will be described as follows.

Figure 23:
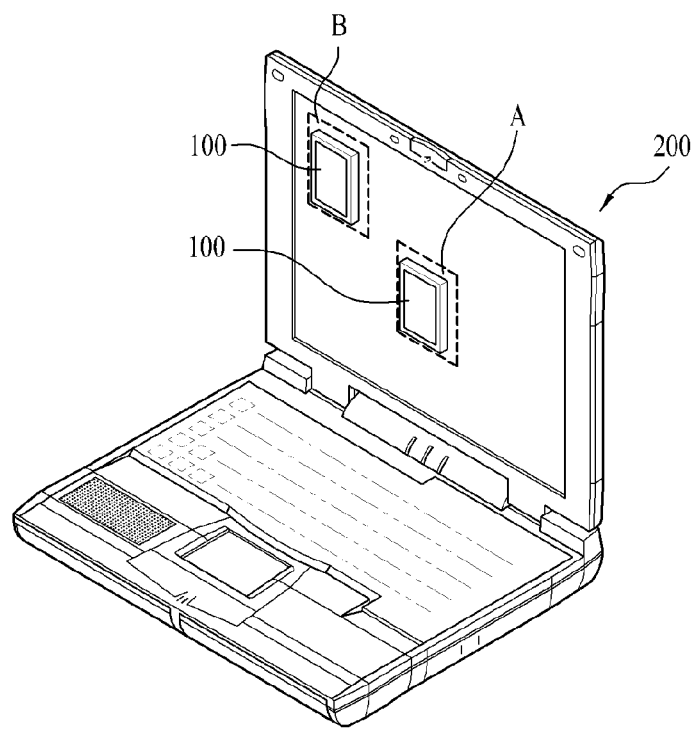
FIG. 23 is a diagram illustrating a controlling method of an external display device or a mobile terminal according to a position of a mobile terminal on an external display device.

FIG. 23 is a diagram illustrating a controlling method of an external display device or a mobile terminal according to a position of a mobile terminal on an external display device.

The external display device 200 may be controlled according to the position of the mobile terminal 100. Referring to FIG. 23, in case the mobile terminal 100 is positioned on a specific position on the external display device 200, a specific control signal may be transmitted to the external display device 200 from the mobile terminal 100. In FIG. 23, the external display device 200 is a note book and the mobile terminal 100 is a mobile phone. According to one embodiment, when the mobile phone 100 is positioned on A region of the note book 200, personal information stored in the mobile phone 100, namely, a note book code is transmitted to the note book 200 and the note book 200 is unlocked. Alternatively, the mobile phone 100 is moving with drawing a specific shape on a display 220 of the note book 200 to unlock the note book 200.

Setting of the mobile terminal 100 can be converted according to the position of the mobile terminal 100 on the external display device 200. As shown in FIG. 23, in case the mobile terminal 100 is positioned on B region located in the left upper end of the mobile terminal 100, functions may be implemented to convert a mode of the mobile terminal into a manner mode or to input a preset phone number to make a call. More specifically, when the mobile terminal 100 is position on the external display device 200, the position of the mobile terminal 100 may be calculated by the NFC device 114 of the mobile terminal 100 or the NFC array antennas 230 arranged in the bezel region 210 of the external display device 200. At this time, in case the mobile terminal 100 is positioned on a specific position of the external display device 200, information for converting the setting of the mobile terminal 100 may be stored in the memory 160 of the mobile terminal 100. Optionally, the external display device 200 may include a memory for storing the information configured to convert the setting of the mobile terminal 100. For example, predetermined information may be stored in the memory 160 to convert the mode of the mobile terminal 100 into the manner mode, make a call to a specific person, sent a SMS or MMS signal and the like. When the mobile terminal 100 is positioned on a specific position of the external display device 200, the controller 180 may implement a function corresponding to the calculated position of the mobile terminal 100 based on the information stored in the memory 160.

According to one embodiment of the present invention, the method mentioned above may be realized by a code arranged in a media having programs recorded therein to be readable by a computer. The computer readable media includes all types of recording devices capable of storing data a computer system can read. Examples of the computer readable media include ROM, RAM, CD-ROM, a magnetic tape, floppy disk, and an optical data storage device. Also, the computer readable media may be realized by a carrier wave (for example, transmission via Internet) and the computer may include the controller 180 of the terminal.

According to the mobile terminal and the method for controlling the mobile terminal, various NFC functions can be applied between the mobile terminal and the external display device by using the position information of the mobile terminal on the external display device.

For example, information on products can be acquired on the mobile terminal 100 and a function of product payment can be implemented simply and effectively by using the information on the position of the mobile terminal on the external display device.

Also, the position of the mobile terminal on the external display device may be accurately calculated at low cost.

Various variations and modifications are possible in the component parts and/or arrangements of the subject combination arrangement within the scope of the disclosure, the drawings and the appended claims.

Although embodiments have been described with reference to a number of illustrative embodiments thereof, it should be understood that numerous other modifications and embodiments can be devised by those skilled in the art that will fall within the spirit and scope of the principles of this disclosure.

What is claimed is:

1. A mobile terminal comprising:
a display configured to display information;
a wireless communication unit configured to transmit or receive a Near Field Communication (NFC) signal; and
a controller configured to:
cause the wireless communication unit to transmit the NFC signal to an external display device or to receive the NFC signal from the external display device when the mobile terminal is placed perpendicular to and in proximity to a display screen of the external display device or when the mobile terminal is placed on the display screen of the external display device;
obtain position information of the mobile terminal when the mobile terminal is placed perpendicular to and in proximity to the display screen of the external display device or when the mobile terminal is placed on the display screen of the display based on at least the NFC signal transmitted to an X-axis NFC array antenna and an Y-axis NFC array antenna of the external display device or the NFC signal received from the X-axis NFC array antenna and the Y-axis NFC array antenna of the external display device, the obtained position information including at least an X-axis position provided by the X-axis NFC array antenna or an Y-axis position provided by the Y-axis NFC array antenna;
cause the wireless communication unit to:
transmit the position information to the external display device; and
receive display information corresponding to the position information from the external display device; and
implement a function according to the received display information,
wherein the X-axis NFC array antenna includes a plurality of NFC antennas arranged side by side along an X-axis side edge portion of the external display device, and the Y-axis NFC array antenna includes a plurality of NFC antennas arranged side by side along an Y-axis side edge portion of the external display device.

2. The mobile terminal according to claim 1, wherein:
the controller is further configured to obtain the position information by measuring a reception sensitivity level of NFC signals transmitted from the X-axis NFC array antenna and the Y-axis NFC array antenna of the external display device.

3. The mobile terminal according to claim 1, wherein the wireless communication unit is further configured to transmit a control signal to the external display device in order to cause the external display device to display information based on the position information.

4. The mobile terminal according to claim 1, wherein:
the display information relates to a product; and
the function implemented by the controller comprises at least displaying information related to the product, a payment process for purchasing the product, or storing the information related to the product.

5. The mobile terminal according to claim 1, wherein the controller is further configured to cause the wireless communication unit to transmit personal information stored in the mobile terminal to the external display device.

6. The mobile terminal according to claim 1, wherein:
the controller is further configured to:
cause the display to display the display information; and
capture the display information displayed on the display; and
the captured display information is transmittable to another device and comprises a partial portion of an image output by the external display device such that only the partial portion of the image is displayed on the display while the entire portion of the image is displayed on the display unit of the external display device.

7. The mobile terminal according to claim 6, wherein:
the partial portion of the image corresponds to one of a plurality of preset regions of the image; and
the controller is further configured to select the one of the plurality of preset regions for display when the mobile terminal is positioned near the one of the plurality of preset regions such that the position information of the mobile terminal corresponds to the one of the plurality of preset regions.

8. The mobile terminal according to claim 1, wherein:
at least one image is displayed on the display unit of the external display device; and
the controller is further configured to cause the display to display at least:

the at least one image displayed on the display unit of the external display device;

a portion of the at least one image corresponding to the position information of the mobile terminal when the mobile terminal is positioned over the portion of the at least one image displayed on the display unit of the external display device; or one of a plurality of images that includes the at least one image when the position information of mobile terminal corresponds to the one of the plurality of images such that a different one of the plurality of images with respect to the plurality of images displayed on the display unit of the external display device is displayed on the display according to movement of the mobile terminal.

9. The mobile terminal according to claim 1, wherein the controller is further configured to cause the wireless communication unit to:

receive the display information from the external display device while in communication with a third party device; and transmit the display information received from the external display device to the third party device.

10. The mobile terminal according to claim 1, wherein the controller is further configured to control displaying of an image on the display unit of the external display device by controlling the wireless communication unit to transmit a control signal according to movement of the mobile terminal such that the image displayed on the display unit of the external display device is adjusted in response to the control signal.

11. The mobile terminal according to claim 1, further comprising:

a proximity sensor configured to detect a distance between the mobile terminal and the external display device, wherein the controller is further configured to cause the display to resize a displayed image according to the detected distance such that the image is enlarged in size as the mobile terminal moves toward the external display device and the image is reduced in size as the mobile terminal moves away from the external display device.

12. The mobile terminal according to claim 1, further comprising:

a sensing module configured to sense a horizontal or vertical orientation of the mobile terminal, wherein the controller is further configured to implement the function according to the sensed horizontal or vertical orientation of the mobile terminal.

13. A display device comprising:

a display configured to display information;

an X-axis Near Field Communication (NFC) array antenna including a plurality of NFC antennas arranged side by side along an X-axis side edge portion of the display;

a Y-axis NFC array antenna including a plurality of NFC antennas arranged side by side along an Y-axis side edge portion of the display; and a controller configured to obtain position information of a mobile terminal when the mobile terminal is placed perpendicular to and in proximity to a display screen of the display or when the mobile terminal is placed on the display screen of the display by either receiving the position information from the mobile terminal via the plurality of NFC antennas or calculating the position information based on intensity levels of NFC signals received from the mobile terminal by each of the plurality of NFC antennas, the position information including at least an X-axis position of the mobile terminal provided by the X-axis NFC array antenna or an Y-axis position of the mobile terminal provided by the Y-axis NFC array antenna.

14. The display device according to claim 13, wherein the controller is further configured to:

determine a specific position of the mobile terminal; and control the display to distinguishably display information corresponding to the specific position.

15. The display device according to claim 13, wherein the controller is further configured to:

receive personal information from the mobile terminal; and control the display to display the personal information or information based on the personal information.

16. A method for controlling a mobile terminal, the method comprising:

receiving a Near Field Communication (NFC) signal from an external display device when the mobile terminal is placed perpendicular to and in proximity to a display screen of the external display device;

obtaining position information of the mobile terminal placed perpendicular to and in proximity to the display screen of the external display device or when the mobile terminal is placed on the display screen of the external display device based on the NFC signal received from an X-axis NFC array antenna and an Y-axis NFC array antenna of the external display device, the position information including at least an X-axis position provided by the X-axis NFC array antenna or an Y-axis position of the mobile terminal provided by the Y-axis NFC array antenna;

transmitting the obtained position information to the external display device;

receiving display information corresponding to the position information from the external display device; and implementing a function according to the received display information, wherein the X-axis NFC array antenna includes a plurality of NFC antennas arranged side by side along an X-axis side edge portion of the external display device and the Y-axis NFC array antenna includes a plurality of NFC antennas arranged side by side along an Y-axis side edge portion of the external display device.

17. The method according to claim 16, further comprising:

transmitting personal information stored in the mobile terminal to the external display device; and causing the external display device to output the personal information or information based on the personal information.

18. The method according to claim 16, wherein the display information is received while the mobile terminal is in communication with a third party device or before communication with the third party device is established, the method further comprising transmitting the display information to the third party device.

19. The method according to claim 16, further comprising:

generating a control signal in response to a specific movement pattern of the mobile terminal; and transmitting the control signal for controlling the external display device.

20. The method according to claim 16, further comprising:

receiving the display information from the external display device when the mobile terminal is positioned at a specific position; and distinguishably displaying information corresponding to the specific position via a display of the mobile terminal.

* * * * *